United States Patent
Ohi

(10) Patent No.: US 9,979,858 B2
(45) Date of Patent: May 22, 2018

(54) IMAGE PROCESSING APPARATUS, IMAGE PROCESSING METHOD AND PROGRAM

(71) Applicant: CANON KABUSHIKI KAISHA, Tokyo (JP)

(72) Inventor: Akinori Ohi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 14/798,855

(22) Filed: Jul. 14, 2015

(65) Prior Publication Data

US 2016/0027183 A1 Jan. 28, 2016

(30) Foreign Application Priority Data

Jul. 22, 2014 (JP) ................. 2014-149065

(51) Int. Cl.
| | |
|---|---|
| H04N 1/60 | (2006.01) |
| G06F 3/03 | (2006.01) |
| H04N 1/387 | (2006.01) |
| H04N 5/33 | (2006.01) |
| H04N 9/04 | (2006.01) |
| G06T 7/13 | (2017.01) |
| G06K 9/00 | (2006.01) |
| G06K 9/46 | (2006.01) |

(52) U.S. Cl.
CPC ......... *H04N 1/6005* (2013.01); *G06F 3/0304* (2013.01); *G06K 9/00201* (2013.01); *G06K 9/00463* (2013.01); *G06K 9/4604* (2013.01); *G06K 9/4633* (2013.01); *G06T 7/13* (2017.01); *H04N 1/3873* (2013.01); *H04N 5/33* (2013.01); *H04N 9/045* (2013.01); *G06F 2203/04101* (2013.01); *G06T 2200/24* (2013.01); *G06T 2207/10008* (2013.01); *G06T 2207/30176* (2013.01); *H04N 2201/0456* (2013.01)

(58) Field of Classification Search
None
See application file for complete search history.

(56) References Cited

U.S. PATENT DOCUMENTS 7,058,224 B2 * 6/2006 Herley ............... H04N 1/00681
382/199
7,697,750 B2 * 4/2010 Simmons ............... G02B 27/46
345/419

(Continued)

FOREIGN PATENT DOCUMENTS

JP 2002-117403 A 4/2002

*Primary Examiner* — Tsung-Yin Tsai
(74) *Attorney, Agent, or Firm* — Fitzpatrick, Cella, Harper & Scinto

(57) ABSTRACT

To specify a contour to be detected even when there are a plurality of candidates of the contour on the periphery of a photographing target, an image processing apparatus comprises: a determining unit which detects a plurality of candidate points being the candidates of the contour of a subject based on distance image information of the subject in an image, and determines an inspection-target area in the image based on the detected candidate points; and a specifying unit which detects line segments existing in the inspection-target area determined by the determining unit, based on luminance information of the inspection-target area, and specifies the line segment being the contour of the subject based on the candidate point from the detected line segments.

13 Claims, 20 Drawing Sheets

(56) References Cited

U.S. PATENT DOCUMENTS

| | | | | |
|---|---|---|---|---|
| 7,808,531 B2* | 10/2010 | Kim | ........................ | H04N 9/73 |
| | | | | 348/223.1 |
| 8,947,508 B2* | 2/2015 | Morimitsu | ............. | G01B 11/24 |
| | | | | 340/578 |
| 2006/0082571 A1* | 4/2006 | McDaniel | ............. | G06T 11/203 |
| | | | | 345/419 |
| 2008/0285848 A1* | 11/2008 | Meyer | .................. | G06K 9/4652 |
| | | | | 382/165 |
| 2009/0102835 A1* | 4/2009 | Mikhailov | ................ | G06T 7/12 |
| | | | | 345/419 |
| 2013/0121592 A1* | 5/2013 | Fujiki | ................. | G01B 11/002 |
| | | | | 382/195 |
| 2013/0182002 A1* | 7/2013 | Macciola | ............... | H04N 1/387 |
| | | | | 345/589 |
| 2015/0228063 A1* | 8/2015 | Minakawa | ............ | H01J 37/244 |
| | | | | 382/151 |
| 2016/0379080 A1* | 12/2016 | Yalniz | ................. | G06K 9/4609 |
| | | | | 382/164 |

\* cited by examiner

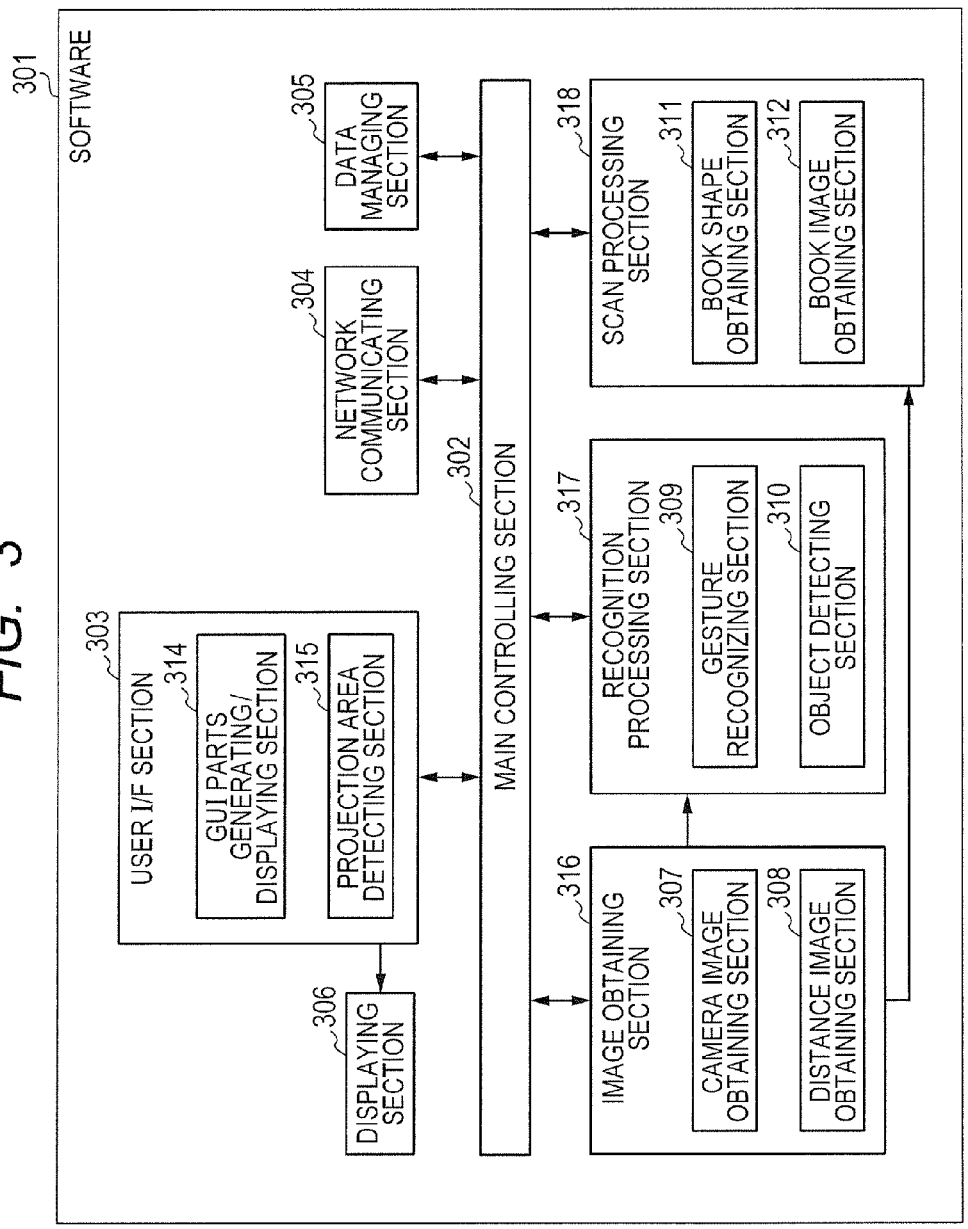

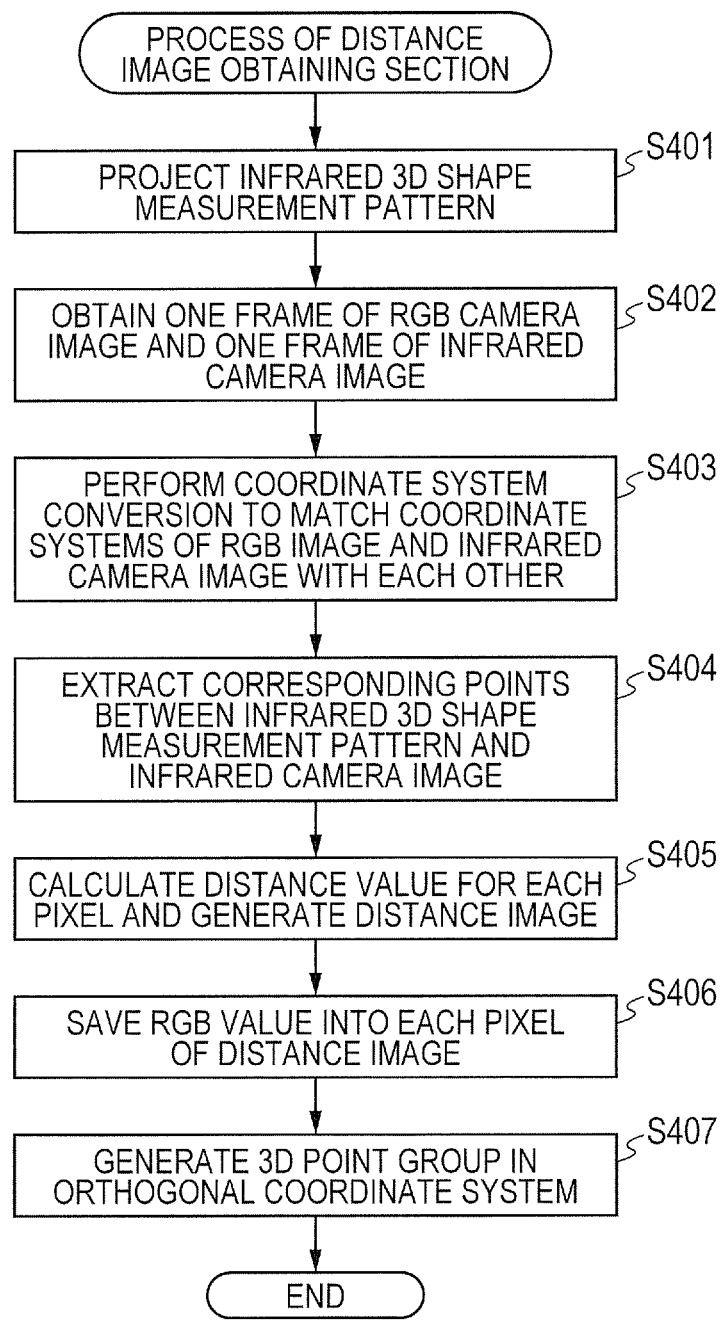

IMAGE PROCESSING APPARATUS, IMAGE PROCESSING METHOD AND PROGRAM

BACKGROUND OF THE INVENTION

Field of the Invention

The present invention relates to an image processing apparatus, an image processing method and a program for achieving the image processing method.

Description of the Related Art

A book scanner has been widely used as a device for easily recording the contents of a book as data. As one of various kinds of book scanners, the stand-type book scanner capable of scanning the book by doing nothing but turning over the pages thereof without destructing the book itself has been known. More specifically, the stand-type book scanner photographs the book by a camera provided above and obtains the image of the photographed book.

Incidentally, as the image of the book, a user requires the contents such as characters, figures and the like described on the double-spread pages of the book. For example, the information of a portion such as the small cut end of the book at which the page edges pile up, the information of the background image of the book, and the like are unnecessary image information for the user in most cases. Nevertheless, it is difficult to automatically discriminate the unnecessary image information like this from the image photographed by the camera. Namely, in the case where the conventional book scanner is used, since the scanned results often include the unnecessary image information, the user has to manually retouch the photographed image, thereby taking a great deal of time.

Therefore, it is an important requirement for the book scanner to automatically obtain the contour of the spread page edge of the book without a manual retouch. Here, as a means for detecting the contour of an object (target), there is a means for detecting the contour of the object by obtaining not only luminance image information of the object but also distance image information (or range image information) of the object from a distance sensor. The distance image information is robust in regard to a change of environmental light. Therefore, even if it is difficult to detect the contour based on the luminance image information, it is possible to detect the relevant contour based on the distance image information. However, in case of a particularly inexpensive distance sensor, it is difficult to obtain high-accuracy contour information. To cope with such a problem, there is a conventional method of detecting the contour based on the luminance image information by using, as a clue, the contour obtained from the distance information. As the conventional technique of obtaining the contour of the object based on the distance information and the luminance image information, there is the technique of Japanese Patent Application Laid-Open No. 2002-117403. More specifically, it is disclosed in Japanese Patent Application Laid-Open No. 2002-117403 that a distance image is first divided into a plurality of grids, the grids of which the distance differences from the respective adjacent grids are larger than the predetermined threshold are narrowed as the grids in which the boundary between the background and the object exist, and the boundary between the background and the object is decided based on the luminance image information within the range of the narrowed grids. Thus, by the technique of Japanese Patent Application Laid-Open No. 2002-117403, it is possible to robustly detect the contour with a simple process even when the illumination is changed.

However, the technique of Japanese Patent Application Laid-Open No. 2002-117403 is to narrow the range in which the object and the background exist by the distance image information, and obtain the boundary by the luminance image information within the narrowed range. Therefore, there is a problem that the contour of the spread page edge of the book is not obtained but the contour of the entire book is obtained. Besides, the plurality of contours appear in the vicinity of the spread page edge due to the portion such as the small cut end of the book at which the pages pile up. However, it is difficult by the technique of Japanese Patent Application Laid-Open No. 2002-117403 to specify which contour should be detected, from among the plurality of contours.

SUMMARY OF THE INVENTION

The present invention aims to specify a contour to be detected even when there are a plurality of candidates of the contour on the periphery of a photographed object.

To achieve such an object as above, an image processing apparatus according to the present invention is characterized by comprising: a determining unit configured to detect a plurality of candidate points being candidates of a contour of a subject based on distance image information (or range image information) of the subject in an image, and to determine an inspection-target area in the image based on the detected candidate points; and a specifying unit configured to detect line segments existing in the inspection-target area determined by the determining unit, based on luminance information of the inspection-target area, and to specify the line segment being the contour of the subject based on the candidate point from the detected line segments.

Thus, in the present invention, it is possible to specify the contour to be detected even when there are the plurality of candidates of the contour on the periphery of the photographed object.

Further features of the present invention will become apparent from the following description of exemplary embodiments with reference to the attached drawings.

BRIEF DESCRIPTION OF THE DRAWINGS

FIG. 2 is a block diagram illustrating an example of the hardware constitution of a controller unit and the like.

FIG. 3 is a block diagram illustrating an example of the software configuration of the scanner camera.

FIG. 4 is a flow chart indicating a distance image (or a range image) obtaining process to be performed by a distance image obtaining section.

DESCRIPTION OF THE EMBODIMENTS

Preferred embodiments of the present invention will now be described in detail in accordance with the accompanying drawings.

First Embodiment

[Constitution of Camera Scanner]

Figure 1A:
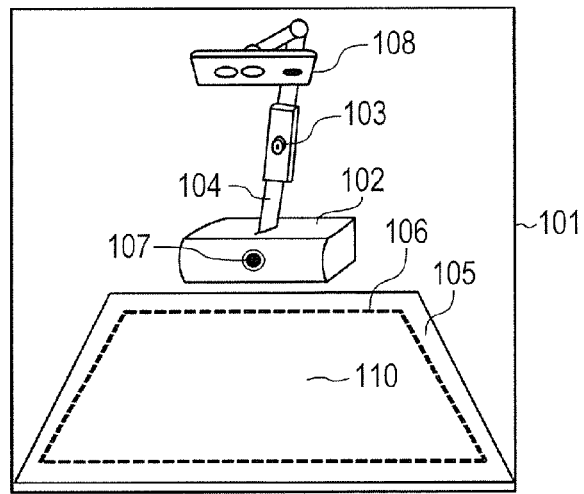
FIGS. 1A, 1B and 1C are diagrams illustrating the constitution of a camera scanner and an example of a coordinate system.
Figure 1B:
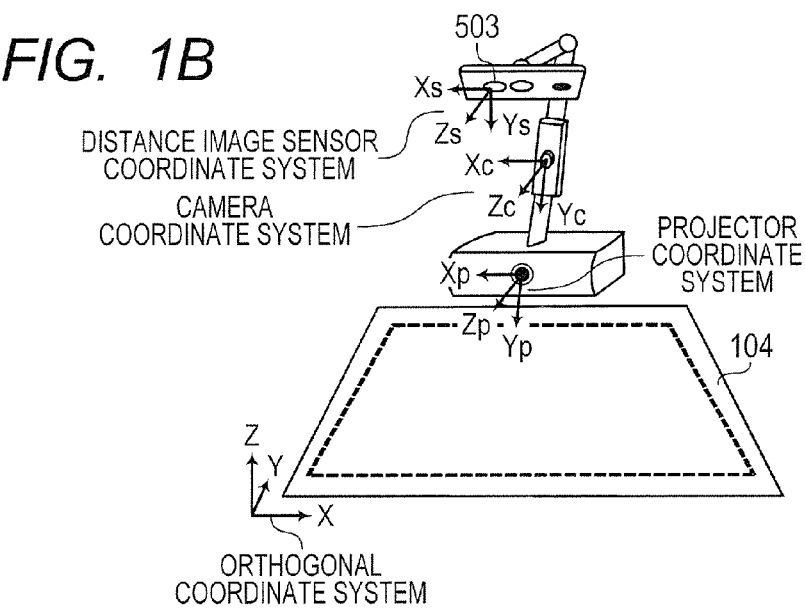
Figure 1C:
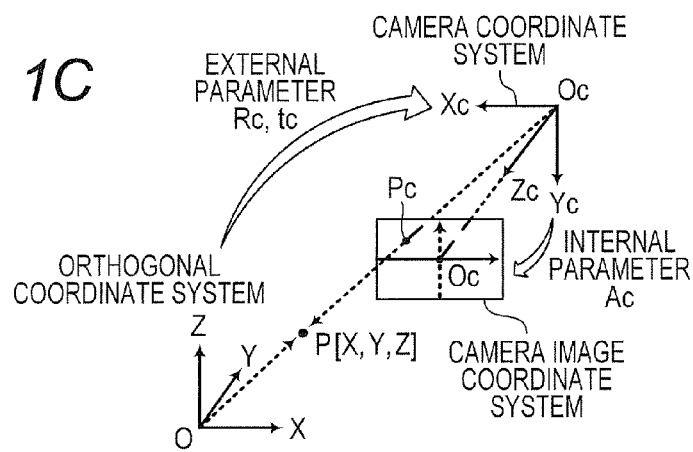

FIGS. 1A to 1C are diagrams illustrating the constitution of a camera scanner 101 and an example of a coordinate system.

As illustrated in FIG. 1A, the camera scanner 101 includes a controller unit 102, a camera unit 103, an arm unit 104, a projector 107 and a distance image sensor unit 108. The controller unit 102, which is the main body of the camera scanner 101, the camera unit 103 used for performing an image pickup operation, the projector 107 and the distance image sensor unit 108 are joined with each other by the arm unit 104. The arm unit 104 can be bent and stretched by using a joint.

The camera scanner 101 is located on a stage 105. The stage 105 may be included in constitutional parts of the camera scanner 101. Lenses of the camera unit 103 and the distance image sensor unit 108 are turned to the direction of the stage 105, and an image within a reading area 106 surrounded by the broken line can be read. In FIG. 1A, a book 110, which is placed within the reading area 106, can be read by the camera unit 103 and the distance image sensor unit 108. The camera unit 103 may be such a camera which images an image with a single resolution or may be such a camera which can perform the high-resolution imaging and the low-resolution imaging. The book 110 is an example of a subject.

The camera scanner 101 can further include an LCD (liquid crystal display) touch panel 230, a speaker 240 and the like.

Figure 2:
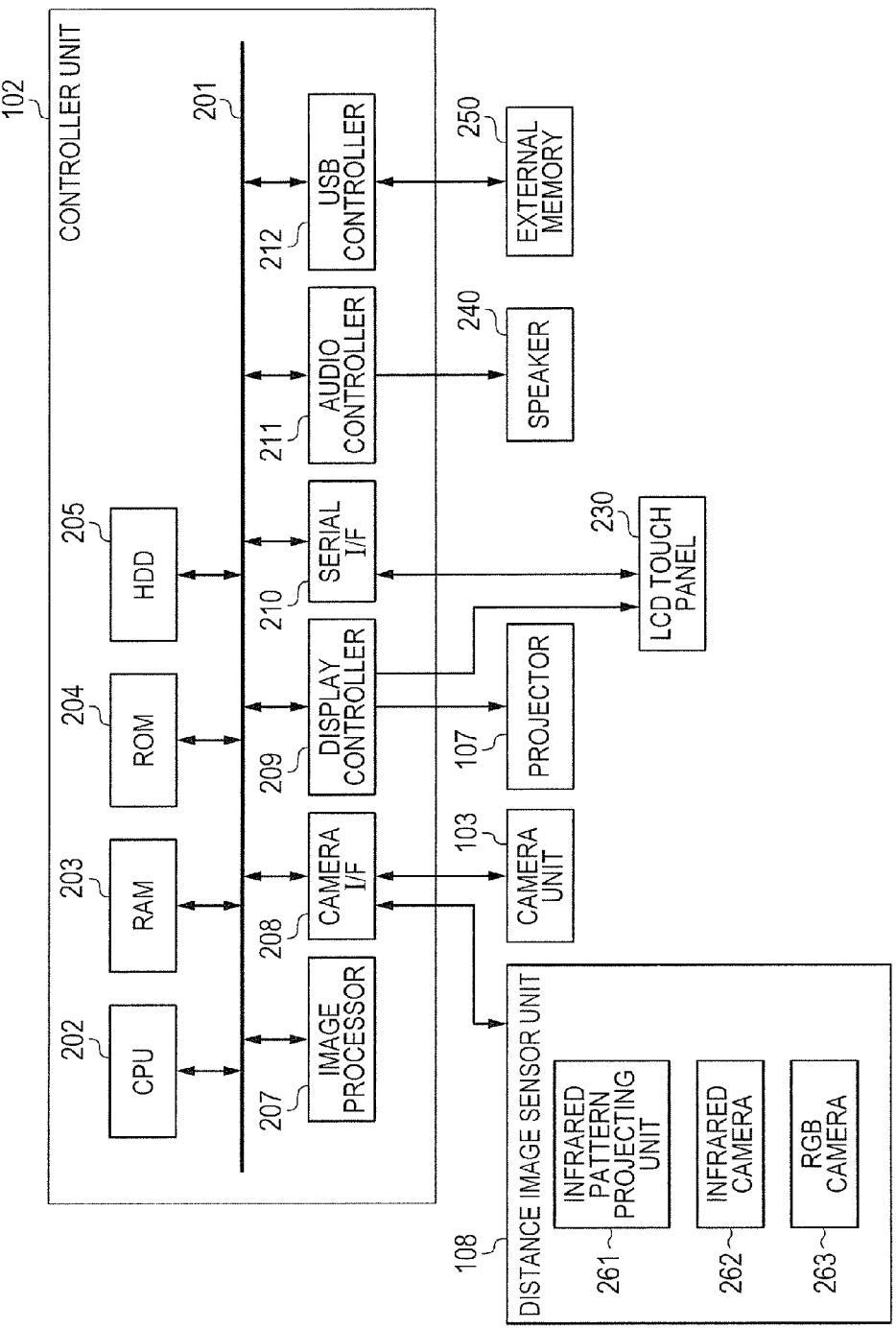

FIG. 1B is a diagram illustrating a coordinate system in the camera scanner 101. In the camera scanner 101, plural independent coordinate systems such as a camera coordinate system, a distance image coordinate system, a projector coordinate system and the like are respectively defined for the hardware devices such as the camera unit 103, the distance image sensor unit 108, the projector 107 and the like. As for the plural coordinate systems, it is defined that an image plane (it is also an image plane projected by the projector 107), which is imaged by the camera unit 103 and an RGB (red-green-blue) camera 263 of the distance image sensor unit 108 to be described later in FIG. 2, is an XY-plane and the direction orthogonal to the image plane is the Z-direction. Further, an orthogonal coordinate system is such a coordinate system which is defined that a plane including the stage 105 is regarded as the XY-plane and the direction vertically upward from the XY-plane is regarded as the Z-axis such that three-dimensional (3D) data of the independent coordinate system can be uniformly treated. The distance image sensor unit 108 is an example of a distance measuring device or a distance measuring unit.

FIG. 1C is a diagram illustrating the relationship between a space, which is expressed by using the orthogonal coordinate system and the camera coordinate system centering on the camera unit 103, and an image plane, which the camera 103 images. As an example of a case of converting the coordinate system, a process of converting a three-dimensional point P[X, Y, Z] in the orthogonal coordinate system into a three-dimensional point $P_c[X_c, Y_c, Z_c]$ in the camera coordinate system will be described. The three-dimensional point P[X, Y, Z] in the orthogonal coordinate system can be converted into the three-dimensional point $P_c[X_c, Y_c, Z_c]$ in the camera coordinate system by the following expression (1).

$$[X_c, Y_c, Z_c]^T = [R_c | t_c][X, Y, Z, 1]^T \quad (1)$$

The $R_c$ and $t_c$ are constituted by external parameters which can be obtained by the position (rotation) and the location (translation) of the camera for the orthogonal coordinate system, and the $R_c$ is called a 3×3 rotation matrix and the $t_c$ is called a translation vector. Conversely, the three-dimensional point defined by the camera coordinate system can be converted into the orthogonal coordinate system by the following expression (2).

$$[X, Y, Z]^T = [R_c^{-1} | -R_c^{-1} t_c][X_c, Y_c, Z_c, 1]^T \quad (2)$$

A two-dimensional (2D) camera image plane to be photographed by the camera unit 103 is obtained by converting three-dimensional information in a three-dimensional space into two-dimensional information by the camera unit 103. That is, the three-dimensional point $P_c[X_c, Y_c, Z_c]$ on the camera coordinate system can be converted into a two-dimensional coordinate $p_c[x_p, Y_p]$ on a camera image plane by performing a perspective projection transformation by the following expression (3).

$$\lambda[x_p, y_p, 1]^T = A[X_c, Y_c, Z_c]^T \quad (3)$$

The A in the expression (3), which is called an internal parameter of camera, is a 3×3 matrix to be expressed by the focal length and the image center or the like.

As described above, a three-dimensional point group expressed by the orthogonal coordinate system can be converted into a three-dimensional point group coordinate in the camera coordinate system or a coordinate on the camera image plane by using the expressions (1) and (3). Incidentally, it is assumed that a calibration is previously performed to internal parameters in the each hardware device and the location and position (external parameters) in relation to the orthogonal coordinate system by the known calibration method. Hereinafter, in case of expressing as the three-dimensional point group without specific notice, the expression represents three-dimensional data in the orthogonal coordinate system.

[Hardware Constitution of Controller of Camera Scanner]

FIG. 2 is a block diagram illustrating an example of the hardware constitution of the controller unit 102 or the like.

The controller unit 102 includes a CPU (central processing unit) 202, a RAM (random access memory) 203, a ROM (read only memory) 204, an HDD (hard disk drive) 205, an image processor 207, a camera I/F (interface) 208 and a display controller 209 which are connected to a system bus 201. The controller unit 102 further includes a serial I/F 210, an audio controller 211 and a USB (universal serial bus) controller 212. The CPU 202 controls the whole operation of the controller unit 102. The RAM 203 is a volatile memory. The ROM 204, which is a nonvolatile memory, in which a program for activating the CPU 202 is stored. The HDD 205 is an HDD, of which the capacity is larger as compared with the RAM 203. A control program or the like of the camera scanner 101, which is operated by the controller unit 102, is stored in the HDD 205.

The CPU 202 executes an activation program stored in the ROM 204 at the time of activation, for example, when the power is turned on or the like. The CPU 202 reads out the control program stored in the HDD 205 via a function to be realized by executing the activation program and then expands the read-out program on the RAM 203. After executing the activation program, the CPU 202 successively executes the control program expanded on the RAM 203. Also, the CPU 202 stores the data to be used in the functional operation achieved by executing the control program on the RAM 203, and performs reading/writing for the stored data. Further, the CPU 202 can set various settings, which are required in operating the control program, to the HDD 205, store image data or the like generated by an input operation of camera and read that stored image data.

The image processor 207 reads the image data from the RAM 203, processes the read image data, and then returns the processed image data to the RAM 203. The image process to be performed by the image processor 207 includes image rotation, magnification change, color conversion and the like.

The camera I/F 208 is connected with the camera unit 103 and the distance image sensor unit 108. The CPU 202 obtains the image data from the camera unit 103 and distance image data from the distance image sensor unit 108 via the camera I/F 208 and then writes them into the RAM 203. In addition, the CPU 202 transmits a control command to the camera unit 103 and the distance image sensor unit 108 via the camera I/F 208 and then performs the settings of the camera unit 103 and the distance image sensor unit 108. The controller unit 102 can further include the display controller 209, the serial I/F 210, the audio controller 211, the USB controller 212 and the like.

The CPU 202 controls the process of displaying image data to a display via the display controller 209. The display controller 209 may be connected with the projector 107 and the LCD touch panel 230.

The CPU 202 inputs and outputs a serial signal via the serial I/F 210. The serial I/F 210 is connected with the LCD touch panel 230, and when the LCD touch panel 230 is depressed by a user, the CPU 202 obtains coordinates on the depressed LCD touch panel 230 via the serial I/F 210.

The audio controller 211 is connected with the speaker 240. The CPU 220 converts audio data into an analog audio signal via the audio controller 211, and then outputs audio based on the analog audio signal via the speaker 240.

The CPU 202 performs the control of an external USB device via the USB controller 212. Here, the USB controller 212, which is connected with an external memory 250 such as a USB memory, an SD (Security Digital) card or the like, is utilized in the process of reading and writing data performed by the CPU 202 to the external memory 250.

The software configuration of the camera scanner to be described later and processes of a flow chart to be described later are realized by the procedure that the CPU 202 performs the processes on the basis of programs stored in the ROM 204 or the HDD 205.

[Software Configuration of Camera Scanner]

FIG. 3 is a block diagram illustrating an example of the software configuration of the camera scanner 101. A main controlling section 302, which functions as the main part of the controlling, controls each of other modules in the configuration of software 301. An image obtaining section 316, which is a module of performing an image inputting process, includes a camera image obtaining section 307 and a distance image obtaining section 308. The camera image obtaining section 307 obtains image data, which is output by the camera unit 103, via the camera I/F 208 and stores the obtained image data in the RAM 203. The distance image obtaining section 308 obtains distance image data, which is output by the distance image sensor unit 108, via the camera I/F 208 and stores the obtained distance image data in the RAM 203. The details of processes to be performed in the distance image obtaining section 308 will be described later with reference to FIGS. 4 to 5C.

A recognition processing section 317, which is a module of detecting and recognizing the motion of an object on the stage 105 from the image data obtained by the camera image obtaining section 307 and the distance image obtaining section 308, includes a gesture recognizing section 309 and an object detecting section 310. When a gesture such as a touch or the like performed by the user is detected while successively obtaining images on the stage 105 from the image obtaining section 316, the gesture recognizing section 309 notifies the detected result to the main controlling section 302. When a physical object placement waiting process or an object removal waiting process is notified from the main controlling section 302, the object detecting section 310 obtains, from the image obtaining section 316, the image of the stage 105 imaged by the camera unit 103. The object detecting section 310 performs a process of detecting the timing of keeping the still condition after the object was placed on the stage 105 or the timing that the object is removed from the stage 105.

A scan processing section 318, which is a module of performing the scan of a book, includes a book shape obtaining section 311 and a book image obtaining section 312. The book shape obtaining section 311 performs a process of specifying a contour such as a page edge or the like by using distance image information and luminance image information. The book image obtaining section 312 creates an image in which a deformation due to thickness of the book is corrected on the basis of the contour obtained by the book shape obtaining section 311. A distance image (or a range image) is such an image which has the value of distance from an input device such as a camera or the like to a physical object for each of pixels. A luminance image is such an image which has a luminance value for each of pixels. The luminance image information is an example of luminance information.

A user I/F section 303 includes a GUI (graphical user interface) parts generating/displaying section 314 and a projection area detecting section 315. The GUI parts generating/displaying section 314 generates GUI parts such as messages, buttons and the like upon receiving a request from the main controlling section 302. Then, the GUI parts generating/displaying section 314 requests to display the generated GUI parts to a displaying section 306. The projection area detecting section 315 detects the displaying place of the GUI parts on the stage 105. The displaying section 306 performs the displaying of the GUI parts requested by the GUI parts generating/displaying section 314 to the projector 107 or the LCD touch panel 230 via the display controller 209. Since the projector 107 is located toward the stage 105, the GUI parts can be projected on the stage 105. The user I/F section 303 receives the gesture operation such as the touch or the like recognized by the gesture recognizing section 309 or an input operation performed from the LCD touch panel 230 via the serial I/F 210 and coordinates of the gesture operation and the input operation. Then, the user I/F section 303 decides the operation content such as the depression of button or the like by the procedure that the content of an operation screen displayed on the displaying section 306 and the coordinates for which the operation was performed are made to correspond to each other. The user I/F section 303 accepts an operation of an operator by notifying the operation content to the main controlling section 302.

A data managing section 305 saves various data such as work data and the like generated in the processing of the software 301 in an area previously located on the HDD 205 and manages the various data. The data managing section 305 saves, for example, images obtained by the camera image obtaining section 307 and the distance image obtaining section 308, the contour of the page edge obtained by the book shape obtaining section 311 and the like in the area previously located on the HDD 205 and manages them. The area may be previously set in a storage unit such as the ROM 204, the HDD 205 or the like. Further, the data managing section 305 may set the area in the storage unit on the basis of an operation of designating the area to an operation unit such as the LCD touch panel 230 or the like performed by the user or the area previously located on the storage unit may be changed.

[Description of Distance Image Sensor and Distance Image Obtaining Section]

Figure 5A:
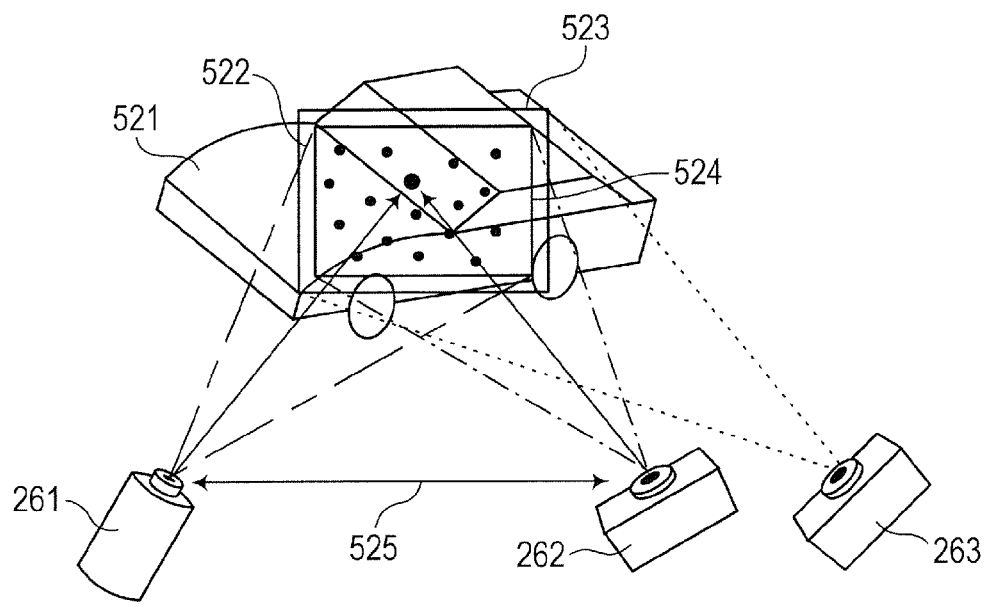
FIGS. 5A, 5B and 5C are diagrams for describing a measurement principle of the distance image obtaining section.
Figure 5B:
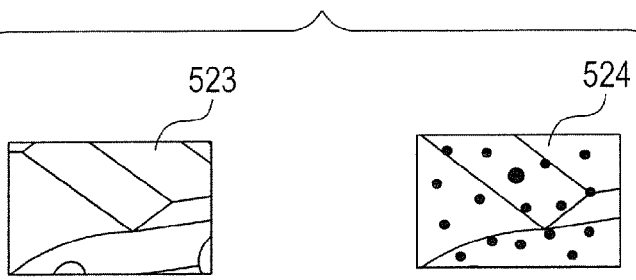
Figure 5C:
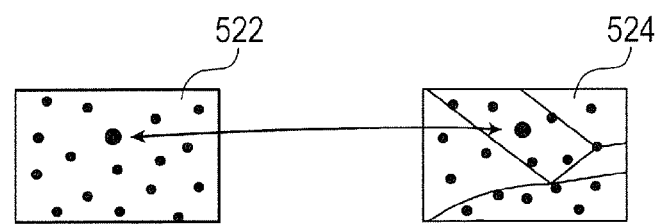

The constitution of the distance image sensor unit 108 is illustrated in FIG. 2. The distance image sensor unit 108 is a distance image sensor of a pattern projection method according to the infrared rays. An infrared pattern projecting unit 261 projects a three-dimensional measurement pattern to the physical object by using the infrared rays invisible for human eyes. An infrared camera 262 is such a camera which reads the three-dimensional measurement pattern projected to the physical object. An RGB camera 263 is such a camera which photographs the visible light which is visible for human eyes by an RGB signal. Processes to be performed by the distance image obtaining section 308 will be described with reference to a flow chart in FIG. 4. FIGS. 5A to 5C are diagrams for describing the measurement principle of the distance image obtaining section 308.

When the distance image obtaining section 308 starts processing, the process of the flow chart in FIG. 4 is started. In S401, the distance image obtaining section 308 projects a three-dimensional shape measurement pattern 522 according to the infrared rays to a physical object 521 as illustrated in FIG. 5A via the infrared pattern projecting unit 261.

In S402, the distance image obtaining section 308 obtains an RGB camera image 523 obtained by photographing a physical object via the RGB camera 263 and an infrared camera image 524 obtained by photographing the three-dimensional shape measurement pattern 522 projected in S401 via the infrared camera 262. Since the location of the infrared camera 262 is different from that of the RGB camera 263, two photographing areas of the RGB camera image 523 and the infrared camera image 524 independently photographed are different from each other as illustrated in FIG. 5C.

In S403, the distance image obtaining section 308 matches the coordinate system of the infrared camera image 524 with the coordinate system of the RGB camera image 523 by using a coordinate system conversion from the coordinate system of the infrared camera 262 to the coordinate system of the RGB camera 263. Incidentally, it is assumed that a relative position between the infrared camera 262 and the RGB camera 263 and respective internal parameters of the infrared camera 262 and the RGB camera 263 are already known matters for the distance image obtaining section 308 by the previous calibration process.

In S404, as illustrated in FIG. 5C, the distance image obtaining section 308 extracts corresponded points between the three-dimensional shape measurement pattern 522 and the infrared camera image 524 to which the coordinate conversion was performed in S403. For example, the distance image obtaining section 308 searches one point on the infrared camera image 524 from the three-dimensional shape measurement pattern 522, and when the same point was detected, the matching is performed. For example, the distance image obtaining section 308 searches a peripheral pattern of pixels of the infrared camera image 524 from the three-dimensional shape measurement pattern 522, and the searched pattern may be matched with a portion having the highest similarity.

In S405, the distance image obtaining section 308 calculates a distance from the infrared camera 262 by performing a calculation, which uses a principle of triangulation, by regarding a line segment formed by joining the infrared pattern projecting unit 261 and the infrared camera 262 as a base line 525. As for a pixel which can be matched in S404, the distance image obtaining section 308 calculates the distance from the infrared camera 262 and treats the calculated distance as a pixel value. As for a pixel which cannot be matched in S404, the distance image obtaining section 308 performs a process of invalidating the pixel value as the portion that the distance could not be measured. The distance image obtaining section 308 performs the process for all the pixels of the infrared camera image 524, to which the coordinate conversion was performed in S403, thereby generating a distance image having distance values in respective pixels.

In S406, the distance image obtaining section 308 generates a distance image having four values of R, G, B and the distance for one pixel by the process that the RGB value of the RGB camera image 523 is saved for each pixel of the distance image generated in S405. The generated distance image is based on the distance image sensor coordinate system defined at the RGB camera 263 of the distance image sensor unit 108.

In S407, the distance image obtaining section 308 converts distance data obtained as the distance image sensor coordinate system into a three-dimensional point group in the orthogonal coordinate system as described in FIG. 1B. Hereinafter, when it is expressed as a three-dimensional point group without specific designation, the three-dimensional point group in the orthogonal coordinate system is to be indicated.

Incidentally, in the present embodiment, although the distance image sensor unit 108 adopts an infrared pattern projection method, a distance image sensor of another method can be also used. For example, the distance image sensor unit 108 may use a stereo system of performing stereoscopic viewing with the two RGB cameras or a TOF (Time of Flight) method of measuring the distance by detecting a flight time of a laser beam.

Figure 6:
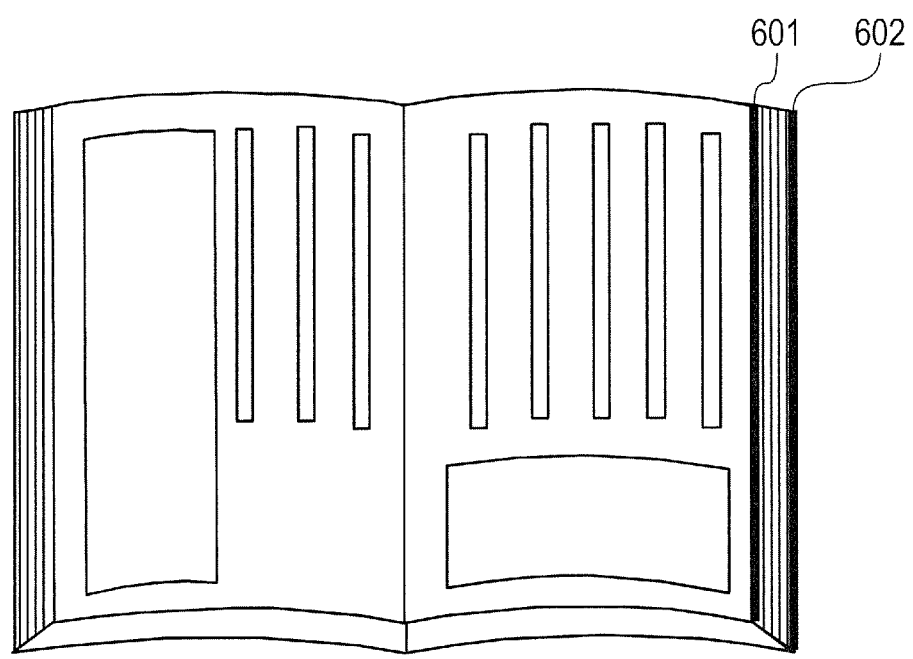
FIG. 6 is a diagram illustrating a spread page edge of a book.

Subsequently, the details of a process of detecting a spread page edge of a book will be described. The spread page edge of the book indicates the boundary of one page which is at the uppermost surface of the spread book as illustrated at a boundary 601 of FIG. 6. In the present embodiment, the technology characterized in that the boundary between the book itself and the background as illustrated at a boundary 602 of FIG. 6 is not detected but the spread page edge of the book is detected will be indicated.

Figure 7:
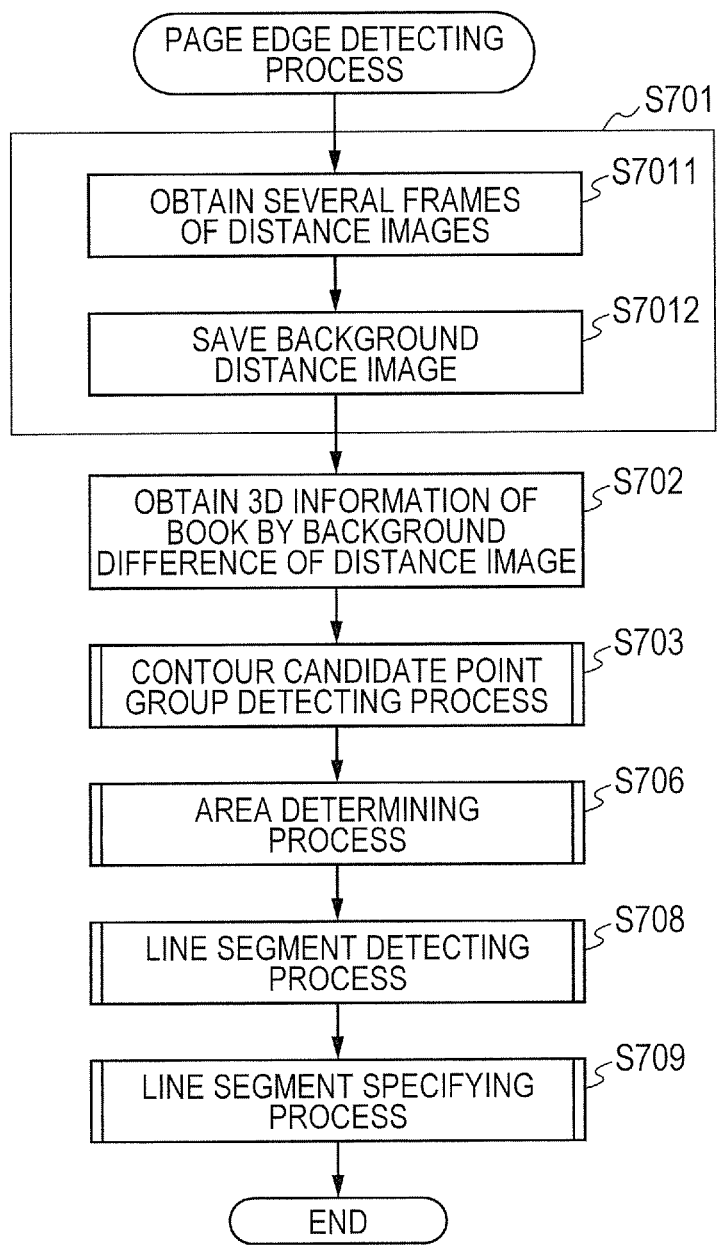
FIG. 7 is a flow chart indicating the whole of a page edge detecting process.

FIG. 7 is a flow chart indicating the whole of a page edge detecting process.

In S701, the distance image obtaining section 308 calculates a distance image of a background. In S7011, the distance image obtaining section 308 obtains a predetermined number of frames of the distance image of the stage 105 on which a book does not exist and records them in the RAM 203. Next, in S7012, the distance image obtaining section 308 calculates distance image information which corresponds to an average of the predetermined number of frames and records it in the RAM 203. The distance image information calculated in S7012 is regarded as a background distance image in the present embodiment. It is assumed that the number of frames is stored in the storage unit such as the ROM 204, the HDD 205 or the like. The distance image obtaining section 308 may obtain the number of frames by reading it from the storage unit. Further, the distance image obtaining section 308 may obtain the number of frames on the basis of the designating operation of the number of frames performed by the user to an operation unit such as the LCD touch panel 230 or the like, or the number of frames stored in the storage unit may be changed.

In S702, the book shape obtaining section 311 calculates distance image information of only the book. In S702, the book shape obtaining section 311 detects information which indicates whether or not a book, which was put on the stage, is detected by the object detecting section 310. When the information was detected, the book shape obtaining section 311 obtains the distance image of the stage 105, on which the book was put, from the distance image obtaining section 308 as an input distance image. As a method of separating the foreground and the background from image information, a background difference method or the like is known as a well-known technology. In the present embodiment, the book shape obtaining section 311 performs the background difference method to the distance image and performs a process of leaving only the portions where the difference between the input distance image and the background distance image is equal to or larger than a predetermined threshold. In addition, the book shape obtaining section 311 paints portions, where a distance difference is less than a predetermined threshold, in black to treat that distance information does not exist. For example, the book shape obtaining section 311 calculates portions where the distance difference between the background distance image and the input distance image is larger than the threshold as the distance image of the whole book area according to the process of S702, and records the calculated result in the RAM 203. It is assumed that the threshold is stored in the storage unit such as the ROM 204, the HDD 205 or the like. The book shape obtaining section 311 may obtain the threshold by reading it from the storage unit. Further, the book shape obtaining section 311 may obtain the threshold on the basis of a designating operation of the threshold performed by the user to the operation unit such as the LCD touch panel 230 or the like, or the threshold stored in the storage unit may be changed.

In S703, the book shape obtaining section 311 detects a contour candidate point group from the distance image of the whole book area. When the physical object is a book, the contour candidate point group is the spread page edge, and the contour candidate point group is expressed as a page edge candidate point group hereinafter for the sake of the description. The details of the contour candidate point group detecting process to be performed in S703 will be described later in FIG. 8.

In S706, the book shape obtaining section 311 determines a line segment detection applicable area which is an area used for applying a line segment detecting process to be performed in S708 on the basis of the page edge candidate point group. The details of the process to be performed in S706 will be described later in FIG. 12.

In S708, the book shape obtaining section 311 detects plural line segments from luminance image information within the line segment detection applicable area determined in S706. The details of the process to be performed in S708 will be described later in FIG. 13.

In S709, the book shape obtaining section 311 specifies one line segment as the page edge from among plural line segments detected in S708. The details of the process to be performed in S709 will be described later in FIG. 15.

Figure 8:
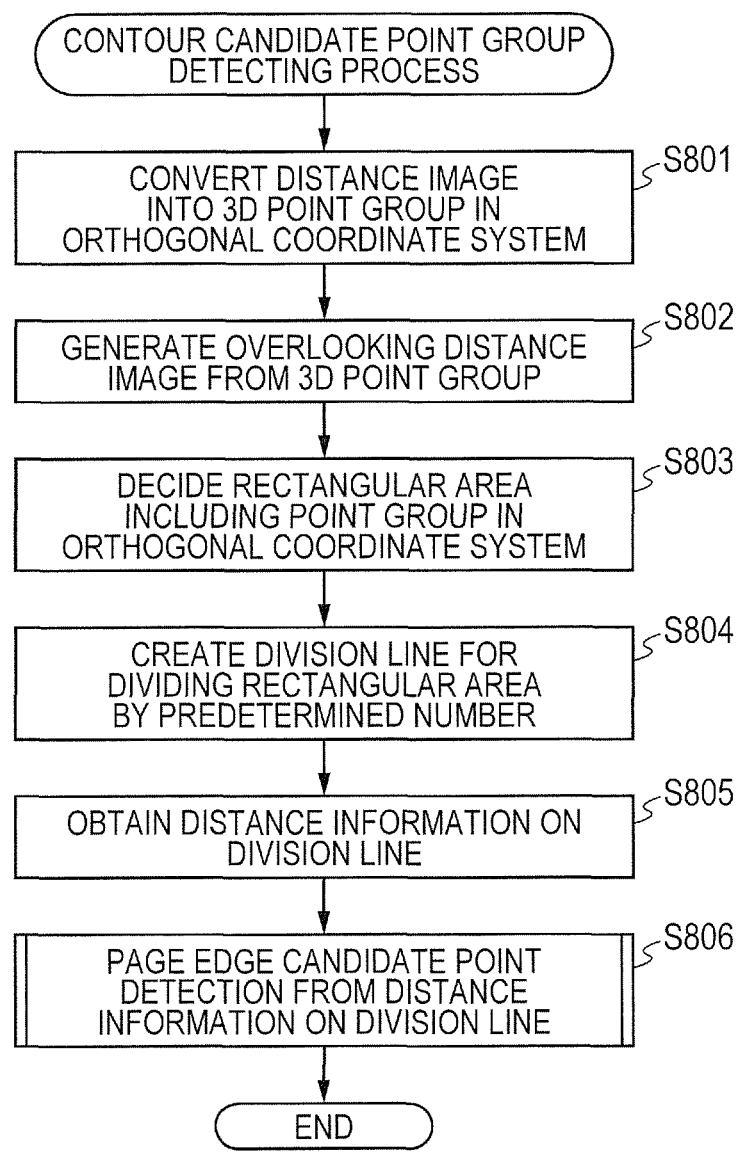
FIG. 8 is a flow chart indicating a contour candidate point group detecting process.

FIG. 8 is a flow chart indicating the contour candidate point group detecting process. The details of the contour candidate point group detecting process in S703 to be performed by the book shape obtaining section 311 will be described with reference to FIG. 8. In S801, the book shape obtaining section 311 converts distance image information into a three-dimensional point group of the orthogonal coordinate system.

Figure 9A:
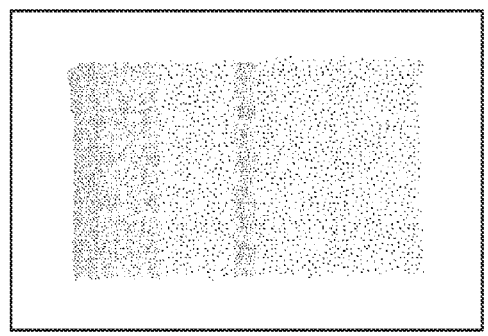
FIGS. 9A, 9B, 9C and 9D are diagrams for describing the contour candidate point group detecting process.

In S802, the book shape obtaining section 311 generates an image where luminance in one pixel is expressed in accordance with a Z-directional value by treating X and Y directions in the orthogonal coordinate system as X and Y directions in the image. Hereinafter, the image is treated as a looking-down distance image. An example of the looking-down distance image will be described in FIG. 9A. According to the process in S802, even if the distance sensor photographed a book from an oblique direction, the book shape obtaining section 311 can obtain the distance image information of the book looked down from the right above. In addition, similar to the process according to the background difference method, a portion, where distance information of the book does not exist, is painted in black, and it is regarded that the distance information does not exist in the portion painted in black.

Figure 9B:
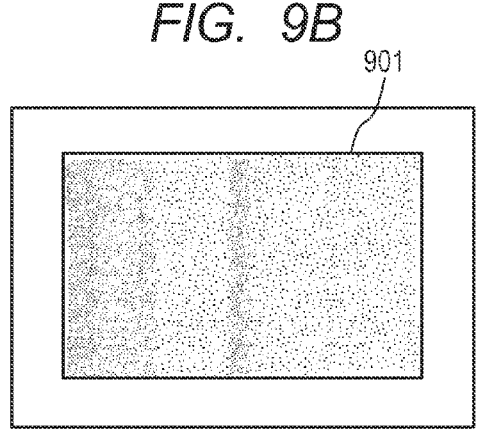

In S803, the book shape obtaining section 311 determines a rectangular area which includes all of the distance information existing in the looking-down distance image as indicated in a rectangle 901 in FIG. 9B. As a method of determining the rectangular area which includes all of the distance information, for example, the utilizing of a cv::minAreaRect function, which is a function within OpenCV (Open Source Computer Vision Library), is the well-known technology.

Figure 9C:
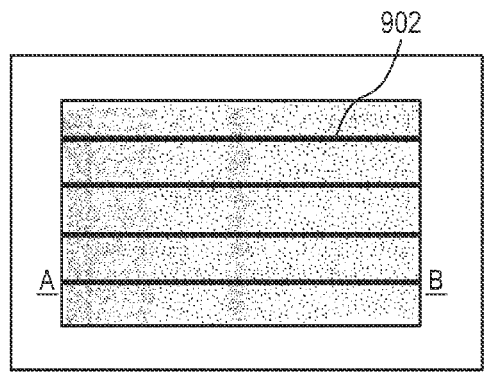

In S804, the book shape obtaining section 311 creates the predetermined number of division lines for the shorter axis in the rectangular area determined in S803 as indicated by division lines 902 in FIG. 9C. It is assumed that the number of division lines is stored in the storage unit such as the ROM 204, the HDD 205 or the like. The book shape obtaining section 311 may obtain the number of division lines by reading it from the storage unit. Further, the book shape obtaining section 311 may obtain the number of division lines on the basis of the designating operation of the number of division lines performed by the user to the operation unit such as the LCD touch panel 230 or the like, or the number of division lines stored in the storage unit may be changed.

Figure 9D:
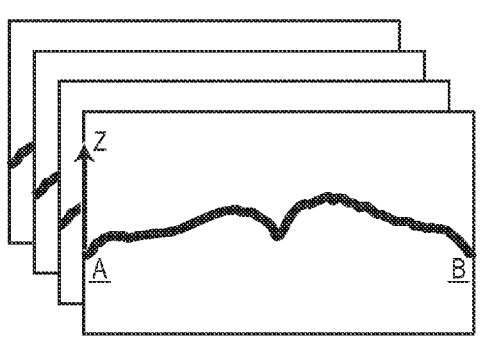

In S805, the book shape obtaining section 311 obtains the distance information on the division line created in S804. The book shape obtaining section 311 can obtain the distance information on the division line by obtaining, for example, distance image information from a start point to an end point of each division line in accordance with a predetermined interval. An example of a result of the distance information on the division line obtained in S805 will be described in FIG. 9D. The book shape obtaining section 311 can obtain the surface shape of the book as the graph as illustrated in FIG. 9D. Hereinafter, in case of expressing the surface shape without specific notice, the relevant surface shape is assumed to indicate the graph as illustrated in FIG. 9D obtained by the processes from S801 to S805. Besides, it is assumed that the interval is stored in the storage unit such as the ROM 204, the HDD 205 or the like. The book shape obtaining section 311 may obtain the interval by reading it from the storage unit. Further, the book shape obtaining section 311 may obtain the interval on the basis of the designating operation of the interval performed by the user to the operation unit such as the LCD touch panel 230 or the like, or the interval stored in the storage unit may be changed.

In S806, the book shape obtaining section 311 performs a page edge candidate point detecting process on the basis of the distance information on the division line obtained in S805. The details of the process to be performed in S806 will be described with reference to FIG. 10.

Figure 10:
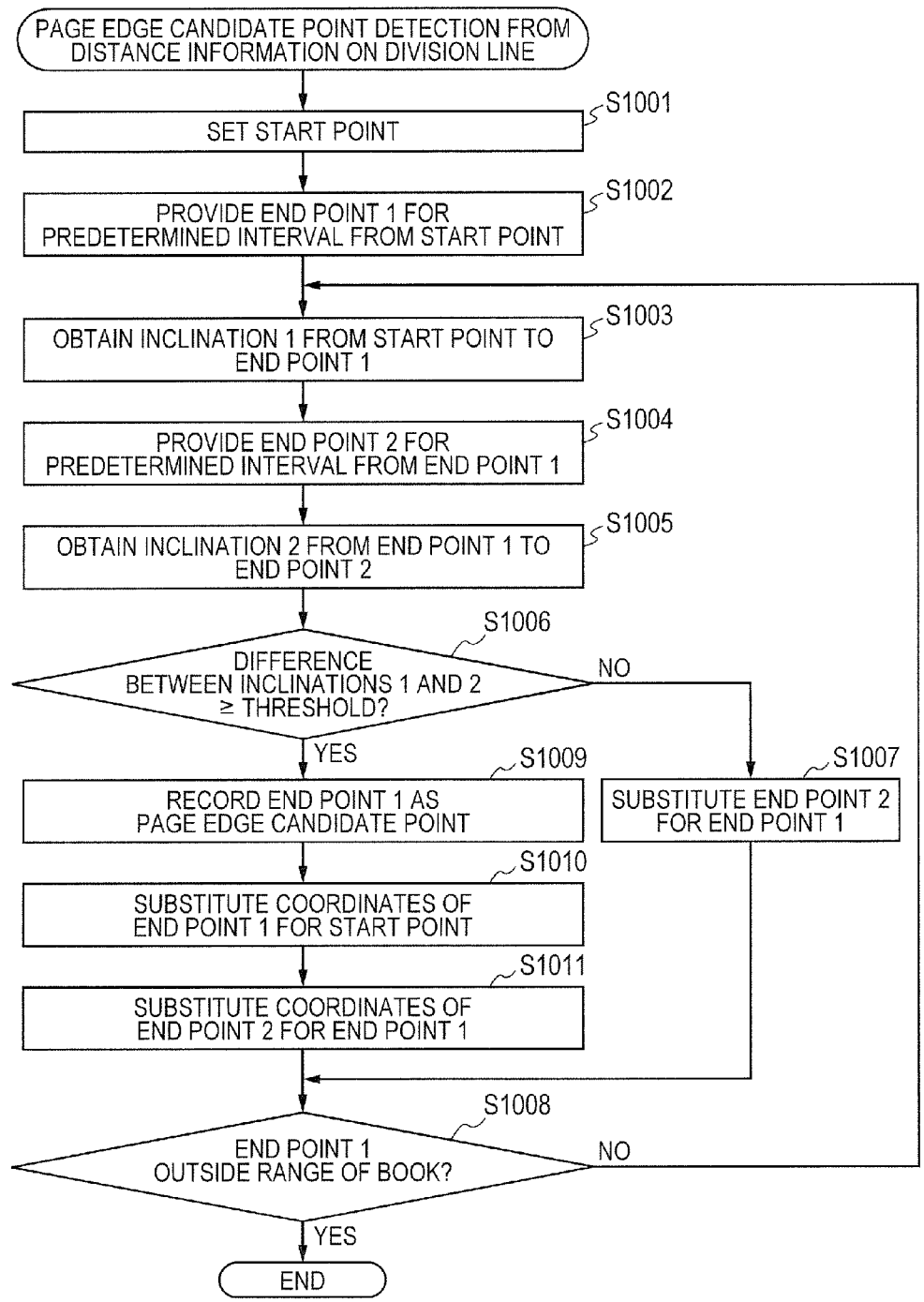
FIG. 10 is a flow chart indicating a page edge candidate point detecting process on a division line.

FIG. 10 is a flow chart indicating the page edge candidate point detecting process to be performed on the division line. Also, FIG. 10 is the flow chart indicating the details of the process to be performed in S806. The description of the page edge candidate point detection on the division line will be described with reference to FIGS. 11A to 11F. FIGS. 11A to 11F are diagrams for describing the page edge candidate point detection to be actually performed on the division line. In FIGS. 11A to 11F, although it is indicated that the page edge candidate point detecting process is to be performed from the center of the book toward the book edge, this process may be performed from the book edge toward the center of the book. In the present embodiment and second and third embodiments, as for the page edge candidate point detecting process on the division line in FIG. 10 and FIGS. 11A to 11F, it will be described that the page edge candidate point detection at one edge of the book is to be performed by the one-time process. However, the page edge candidate point detection at both edges of the book may be performed by the one-time page edge candidate point detecting process.

Figure 11C:
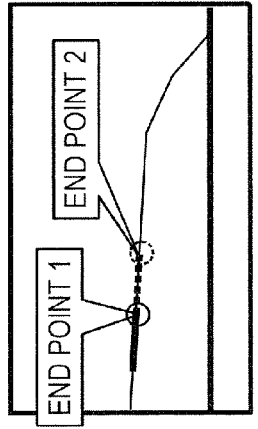
FIGS. 11A, 11B, 11C, 11D, 11E and 11F are diagrams for describing the page edge candidate point detection on the division line.
Figure 11B:
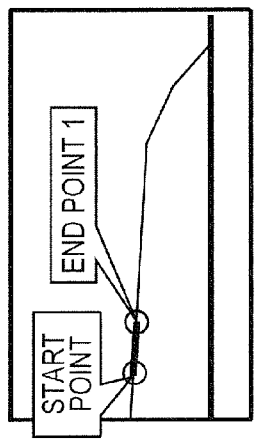
Figure 11A:
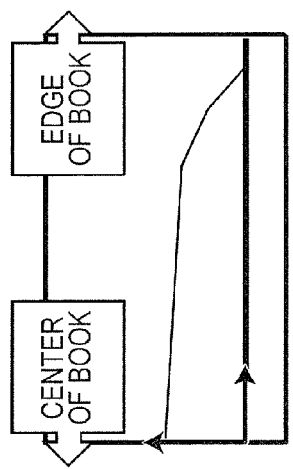

FIG. 11A is a diagram in which the portion of one edge of the book in FIG. 9D is enlarged, and an example for FIG. 11A will be described in S806 and the flow chart in FIG. 10. Although the following operation will be described by using the start point, an end point 1 and an end point 2, it is assumed that all the points exist on the surface shape as long as without specific designation.

In S1001, the book shape obtaining section 311 sets the start point for the sake of performing the page edge candidate point detecting process on the division line. In the present embodiment, a predetermined portion on the division line is regarded as the start point. It is assumed that the start point is stored in the storage unit such as the ROM 204, the HDD 205 or the like. The book shape obtaining section 311 may obtain the start point by reading it form the storage unit. Further, the book shape obtaining section 311 may obtain the start point on the basis of the designating operation of the start point performed by the user to the operation unit such as the LCD touch panel 230 or the like, or the start point stored in the storage unit may be changed.

In S1002, the book shape obtaining section 311 provides the end point 1 for a predetermined interval from the start point on the division line as indicated in FIG. 11B. It is assumed that the interval is stored in the storage unit such as the ROM 204, the HDD 205 or the like. The book shape obtaining section 311 may obtain the interval by reading it form the storage unit. Further, the book shape obtaining section 311 may obtain the interval on the basis of the designating operation of the interval performed by the user to the operation unit such as the LCD touch panel 230 or the like, or the interval stored in the storage unit may be changed.

In S1003, the book shape obtaining section 311 obtains an inclination 1 when the start point and the end point 1 are joined by a line segment. As for a calculating method of the inclination 1, as indicated in FIG. 11A, there are two axis of (PX, PY), and when it is defined that the start point is (X1, Y1) and the end point 1 is (X2, Y2), the inclination 1 can be obtained by the following expression.

$$\text{inclination } 1 = \arctan((Y2-Y1)/(X2-X1))$$

In S1004, the book shape obtaining section 311 provides an end point 2 for a predetermined interval from the end point 1 as illustrated in FIG. 11C. It is assumed that the interval is stored in the storage unit such as the ROM 204, the HDD 205 or the like. The book shape obtaining section 311 may obtain the interval by reading it from the storage unit. Further, the book shape obtaining section 311 may obtain the interval on the basis of the designating operation of the interval performed by the user to the operation unit such as the LCD touch panel 230 or the like, or the interval stored in the storage unit may be changed.

In S1005, the book shape obtaining section 311 obtains the inclination from the end point 1 to the end point 2 as an inclination 2. An obtaining method of the inclination 2 is similar to that of the inclination 1.

In S1006, the book shape obtaining section 311 decides whether or not the difference between the inclination 1 and the inclination 2 is equal to or larger than a threshold. When it was decided that the difference between the inclination 1 and the inclination 2 is equal to or larger than the threshold (FIG. 11E), the book shape obtaining section 311 advances the process to S1009. When it was decided that the difference between the inclination and the inclination 2 is less than the threshold, the book shape obtaining section 311 advances the process to S1007. It is assumed that the threshold is stored in the storage unit such as the ROM 204, the HDD 205 or the like. The book shape obtaining section 311 may obtain the threshold by reading it from the storage unit. Further, the book shape obtaining section 311 may obtain the threshold on the basis of the designating operation of the threshold performed by the user to the operation unit such as the LCD touch panel 230 or the like, or the threshold stored in the storage unit may be changed.

In S1007, the book shape obtaining section 311 substitutes coordinates of the end point 2 for the end point 1.

In S1008, the book shape obtaining section 311 decides whether or not the coordinates of the end point 1 after substituting the coordinates of the end point 2 in S1007 are outside the range of the book. When the coordinates of the end point 1 are outside the range of the book, the book shape obtaining section 311 terminates the page edge candidate point detecting process on the division line. When the coordinates of the end point 1 are inside the range of the book, the book shape obtaining section 311 advances the process to S1003, and an inclination from the start point to the end point 1, for which the coordinates of the end point 2 were substituted, is obtained as the inclination 1 as in FIG. 11D.

In S1009, the book shape obtaining section 311 records the end point 1 as the page edge candidate point.

Figure 11F:
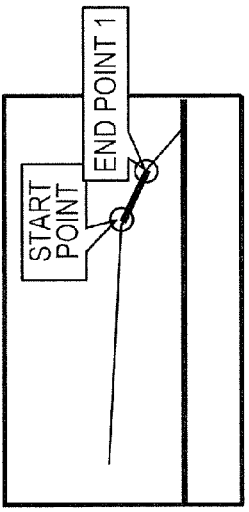
Figure 11E:
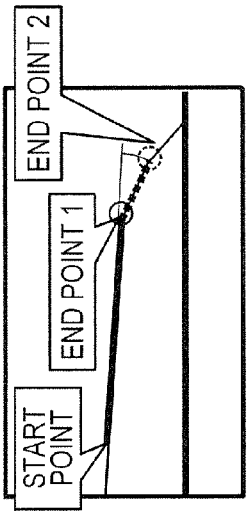
Figure 11D:
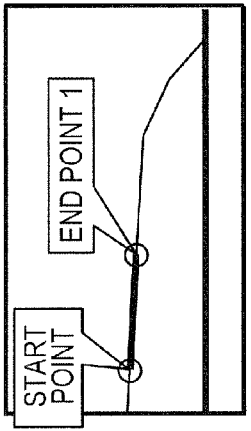

In S1010, the book shape obtaining section 311 substitutes the coordinates of the end point 1 for the start point as in FIG. 11F.

In S1011, the book shape obtaining section 311 substitutes the coordinates of the end point 2 for the end point 1. The book shape obtaining section 311 performs the search similarly from S1003 until when the end point 1 is outside the range of the book by treating a portion, which was detected as the page edge candidate point by the processes in S1010 and S1011, as the start point. In the present embodiment, it will be described under the condition that the book shape obtaining section 311 obtains a candidate point on the division line by limiting it to one point that is the portion where the inclination difference becomes the maximum or the portion closest to the central part of the book.

Figure 12:
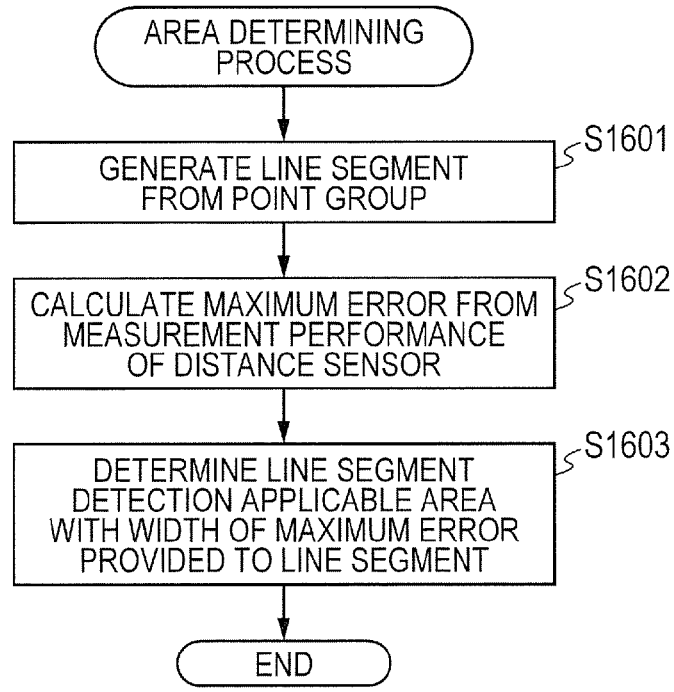
FIG. 12 is a flow chart indicating an area determining process.

Next, an area determining process in S706 to be performed by the book shape obtaining section 311 will be described. The details of the area determining process in S706 will be described in FIG. 12. FIG. 12 is a flow chart indicating the area determining process.

In S1601, the book shape obtaining section 311 generates a line segment, which minimizes an error between the line segment and a page edge candidate point group, by a least squares method. The line segment according to the least squares method can be generated by the known technology of utilizing, for example, a cvFitLine function which is the function in an OpenCV (Open Source Computer Vision Library).

In S1602, the book shape obtaining section 311 calculates the maximum error from the measurement performance of the distance image sensor unit 108. The maximum error is an example of a measurement error of the distance image sensor unit 108.

In S1603, the book shape obtaining section 311 determines a rectangular area, which was determined by providing the width calculated from the error obtained in S1602 to the line segment generated in S1601, as a line segment detection applicable area. The width calculated from the error obtained in S1602 is an example of an error width. In the present embodiment, the width was treated as the value calculated on the basis of the maximum error of the distance image sensor unit 108 in S1602. However, the book shape obtaining section 311 may determine the width in accordance with, for example, a fixed value previously set by the user, a value determined according to the width of the book, resolution of a camera, an error of calibration, the thickness of the book or the like. The line segment detection applicable area is an example of an inspection-target area.

Figure 13:
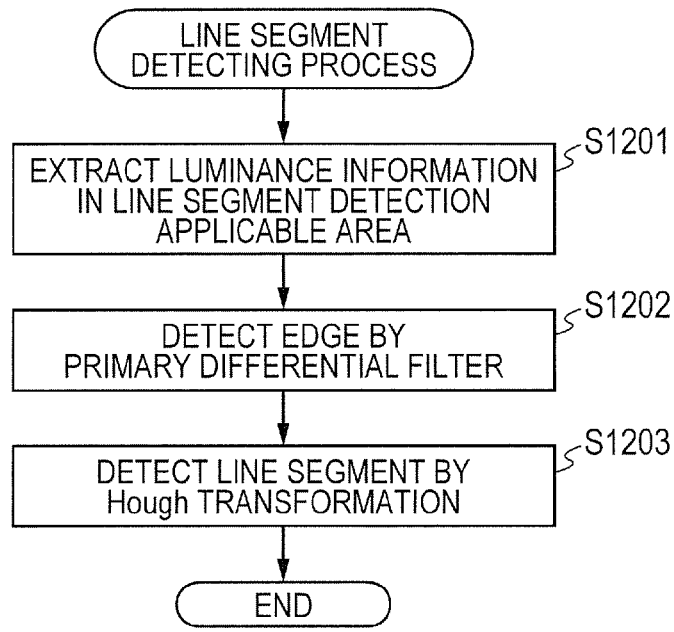
FIG. 13 is a flow chart indicating a line segment detecting process.

Next, the details of the line segment detecting process in S708 to be performed by the book shape obtaining section 311 will be described with reference to FIG. 13. FIG. 13 is a flow chart indicating the line segment detecting process. In the present embodiment, the line segment detection applicable area to be determined in the process of S706 is assumed to be one area in the subsequent processes, however when plural line segment detection applicable areas exist, respective processes are to be performed to each of the plural line segment detection applicable areas.

In S1201, the book shape obtaining section 311 extracts luminance image information in the line segment detection applicable area determined in S706 from luminance image information obtained from the camera image obtaining section 307.

In S1202, the image shape obtaining section 311 performs the edge detection to the luminance image information in the line segment detection applicable area. More specifically, the book shape obtaining section 311 applies a primary differential filter to the luminance image information in the line segment detection applicable area and obtains image data obtained as a result of emphasizing the portion of which the luminance difference is larger as compared with the peripheral luminance difference. In the present embodiment, the book shape obtaining section 311 performs the edge detection by utilizing the primary differential filter. However, the edge detection may be performed by utilizing a secondary differential filter such as a Laplacian filter or the like.

In S1203, the book shape obtaining section 311 performs the line segment detection for only the predetermined number of line segments to the image which was edge-detected in S1202 by using a Hough transformation. As a method of the line segment detection, for example, the Hough transformation or the like such as a cvHoughLines2 function in the OpenCV is known as the known technology. It is assumed that the number of the line segments, to which the detection is performed, is stored in the storage unit such as the ROM 204, the HDD 205 or the like. The book shape obtaining section 311 may obtain the number of the line segments, to which the detection is performed, by reading it from the storage unit. Further, the book shape obtaining section 311 may obtain the number of the line segments, to which the detection is performed, on the basis of the designating operation of the number of the line segments, to which the detection is performed, performed by the user to the operation unit such as the LCD touch panel 230 or the like, or the number of the line segments, to which the detection is performed, stored in the storage unit may be changed.

Next, the details of the line segment specifying process in S709 to be performed by the book shape obtaining section 311 will be described with reference to FIGS. 14A to 14F and FIG. 15. FIGS. 14A to 14F are diagrams for describing the line segment specifying process. FIG. 15 is a flow chart indicating the line segment specifying process. It is assumed that the page edge candidate point group in S709 is such a page edge candidate point group which was used in order to determine the line segment detection applicable area as long as without specific designation in the following description. Further, it is assumed that when the plural line segment detection applicable areas exist, the book shape obtaining section 311 performs the respective processes to each of the plural line segment detection applicable areas.

Figure 14A:
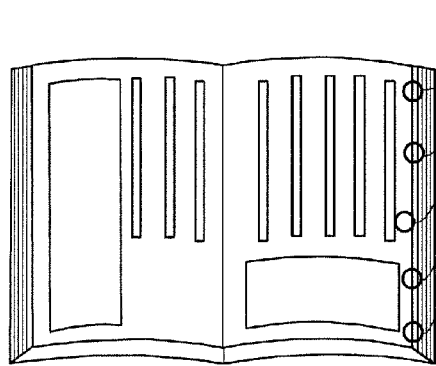
FIGS. 14A, 14B, 14C, 14D, 14E and 14F are diagrams for describing a line segment specifying process.
Figure 14B:
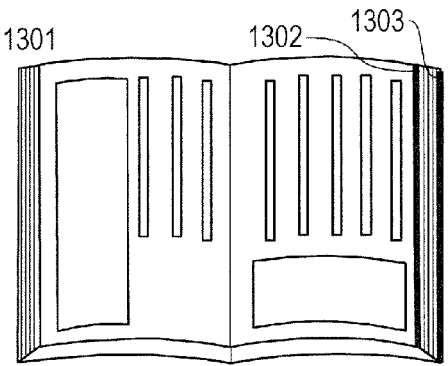
Figure 15:
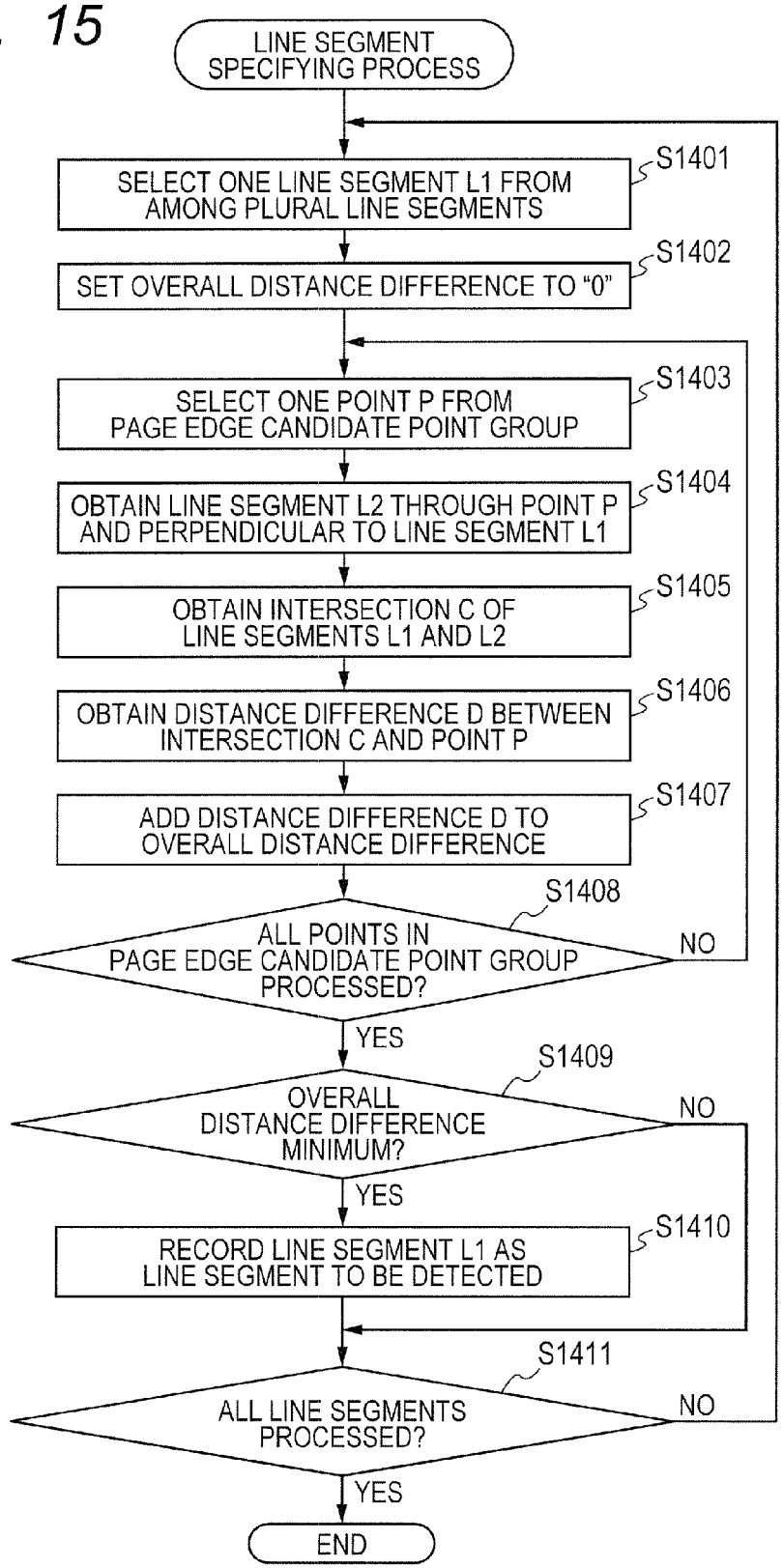
FIG. 15 is a flow chart indicating the line segment specifying process.

The following example will be described under the condition that a point group 1301 in FIG. 14A is assumed to be the page edge candidate point group and line segments 1302 and 1303 in FIG. 14B are assumed to be plural line segments which were detected in S708.

Figure 14C:
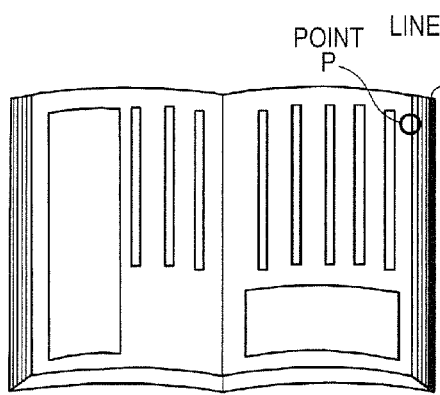
Figure 14D:
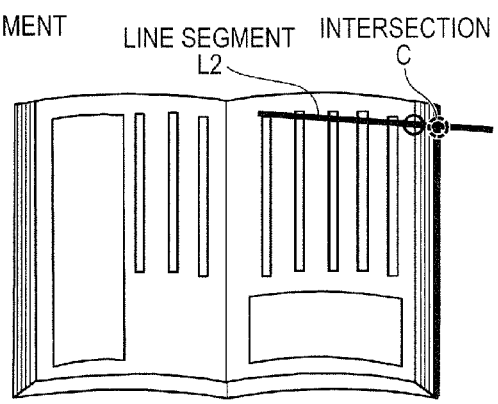

In S1401, the book shape obtaining section 311 selects one line segment from among the plural line segments detected in S708 as a line segment L1. In FIGS. 14C and 14D, an example that the line segment 1303 was selected as the line segment L1 will be described.

In S1402, the book shape obtaining section 311 sets the value of the overall distance difference, which exists on a memory such as the RAM 203 or the like, to "0". A sum of distance between the page edge candidate points in the page edge candidate point group and the line segment L1 is stored for the overall distance difference.

In S1403, the book shape obtaining section 311 selects one point from the point group 1301 as a point P.

In S1404, the book shape obtaining section 311 obtains a line segment L2 which passes through the point P and perpendicular to the line segment L1, as illustrated in FIG. 14D.

In S1405, the book shape obtaining section 311 obtains the intersection of the line segments L1 and L2 as an intersection C.

In S1406, the book shape obtaining section 311 obtains a distance difference D between the intersection C and the point P. Here, the distance difference D becomes the distance between the point P and the line segment L1.

In S1407, the book shape obtaining section 311 adds the distance difference D to the overall distance difference.

In S1408, the book shape obtaining section 311 decides whether or not processes are completed for all the points in the point group 1301. If the processes are not completed for all the points, the processes from S1403 to S1407 are performed to the points to which the processes are not yet completed.

In S1409, the book shape obtaining section 311 decides whether or not the overall distance difference is the minimum from the time when starting processes in the flow chart of FIG. 15. More specifically, the book shape obtaining section 311 compares the overall distance difference with the value held as the minimum overall distance difference, and when the overall distance difference is less than the minimum overall distance difference, the overall distance difference is regarded as the minimum, and the value of the overall distance difference is substituted for the minimum overall distance difference. When the overall distance difference is the minimum, the book shape obtaining section 311 advances the process to S1410, and when the overall distance difference is not the minimum, the book shape obtaining section 311 advances the process to S1411.

In S1410, the book shape obtaining section 311 records the line segment L1 in the RAM 203 as the page edge to be detected.

In S1411, the book shape obtaining section 311 decides whether or not the processes from S1401 to S1410 are completed for all the line segments. When the processes are completed for all the line segments, the book shape obtaining section 311 terminates the process of S709, and when the processes are not completed for all the line segments, the book shape obtaining section 311 advances the process to S1401.

Figure 14E:
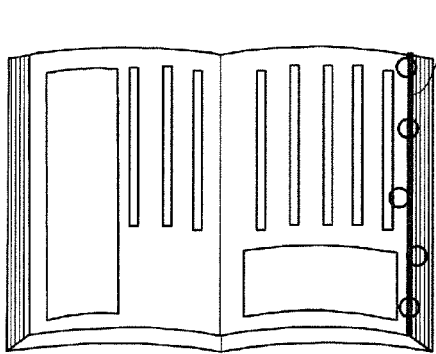
Figure 14F:
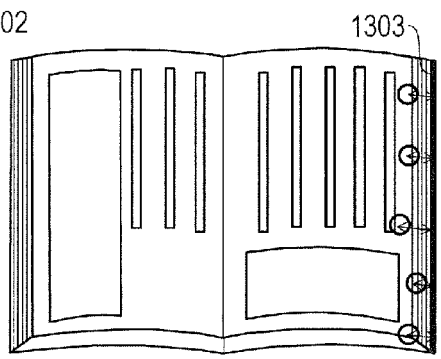

An example of a result of the line segment specifying process in S709 will be indicated in FIGS. 14E and 14F.

For example, as in FIG. 14E showing the line segment 1302, when the spread page edge almost coincides with the line segment, the distance difference between the line segment and the page edge candidate point group becomes small difference as compared with a case that the line segment is deviated from the spread page edge. Conversely, as in FIG. 14F showing the line segment 1303, when the line segment coincides with the contour portion of the whole book, the distance difference between the line segment and the page edge candidate point group becomes large difference as compared with a case that the line segment almost coincides with the spread page edge. In the present embodiment, the book shape obtaining section 311 specifies the page edge to be detected on the basis of the distance difference between the line segment and the page edge candidate point group by performing the line segment specifying process in S709.

The book shape obtaining section 311 becomes possible to perform the following process by the process of the present embodiment. That is, the book shape obtaining section 311 can specify the line segment, which minimizes the distance difference between the line segment and the page edge candidate point group obtained by the process of S703, as the line segment to be detected even when plural line segments, which become candidates of the contour as in FIG. 14B showing the line segments 1302 and 1303, are generated.

Second Embodiment

Figure 16A:
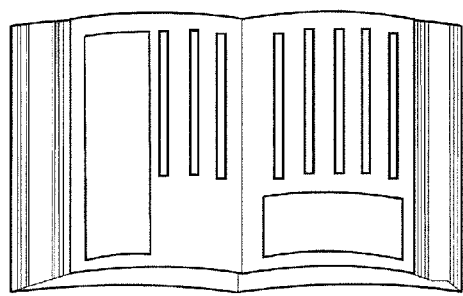
FIGS. 16A, 16B and 16C are diagrams for describing a situation, in which a step appears at a page edge of the book.

In the first embodiment, the subsequent processes from S703 have been described by exemplifying a case that only the one page edge candidate point on the division line of the rectangular area, which includes all the distance information existing in the looking-down distance image, is detected. However, for example, in a case that plural steps appear on a page edge because of a thick book as in FIG. 16A, plural page edge candidate points sometimes exist on the division line. When the plural page edge candidate points exist on the division line, plural rectangular areas are formed from the page edge candidate point groups as in FIG. 16B. However, in the first embodiment, the book shape obtaining section 311 cannot decide that the line segment detection should be applied to which the area. In the present embodiment, it will be described about a process of selecting an area, which is closest to the central part of the book, as the line segment detection applicable area when plural steps appeared on the page edge. Processes to be performed by the book shape obtaining section 311 in the present embodiment are expressed by the flow chart in FIG. 7 similar to the case of the first embodiment. However, the area determining process in S706 is expressed by a flow chart in FIG. 17.

In S1701, the book shape obtaining section 311 performs the clustering of the page edge candidate point group which was detected by the contour candidate point group detecting process in S703. As the clustering method, for example, a Mean Shift method which can perform the clustering by automatically determining the number of clusters can be enumerated as an example. As in FIG. 16B, when page edge candidate point groups appear on the plural steps, for example, the clustering can be performed to the point groups on the basis of width, which is used for determining a rectangle in S706, in the Mean Shift method. However, as the clustering method, it is not limited to the above method, and the point groups may be classified for each of the steps. The classified point group is a set of the page edge candidate points which belong to the same class.

In S1702, the book shape obtaining section 311 selects a point group, which belongs to one class, from among classes classified in S1701.

In S1705 to S1707, the book shape obtaining section 311 generates a line segment, which minimizes an error between the line segment and the point group, to the point group, which belongs to the one class, and determines a rectangular area with a width provided to the line segment. The processing content of S1705 is the same as that of S1601. The processing content of S1706 is the same as that of S1602. The processing content of S1707 is the same as that of S1603.

In S1703, the book shape obtaining section 311 decides whether or not the processes were completed for all the classes classified in S1701. When the processes for all the classes are not yet completed, the book shape obtaining section 311 selects point groups of the classes, to which the processes are not yet completed, in S1702, and the processes form S1702 to S1703 are performed similarly. When the processes were completed for all the classes, the book shape obtaining section 311 advances the process to S1704.

In S1704, the book shape obtaining section 311 determines an area, which is closest to the central part of the book, as the line segment detection applicable area. The book shape obtaining section 311 performs the processes from S708 to S709 in FIG. 7 to the line segment detection applicable area selected in S1704 and specifies the page edge.

Figure 16B:
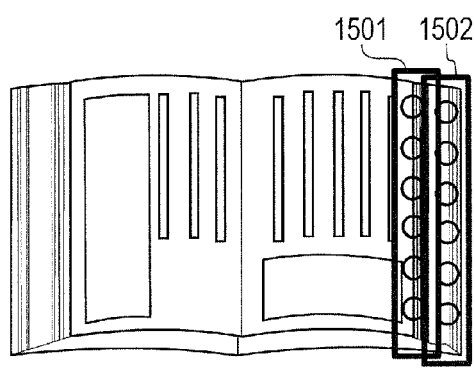
Figure 17:
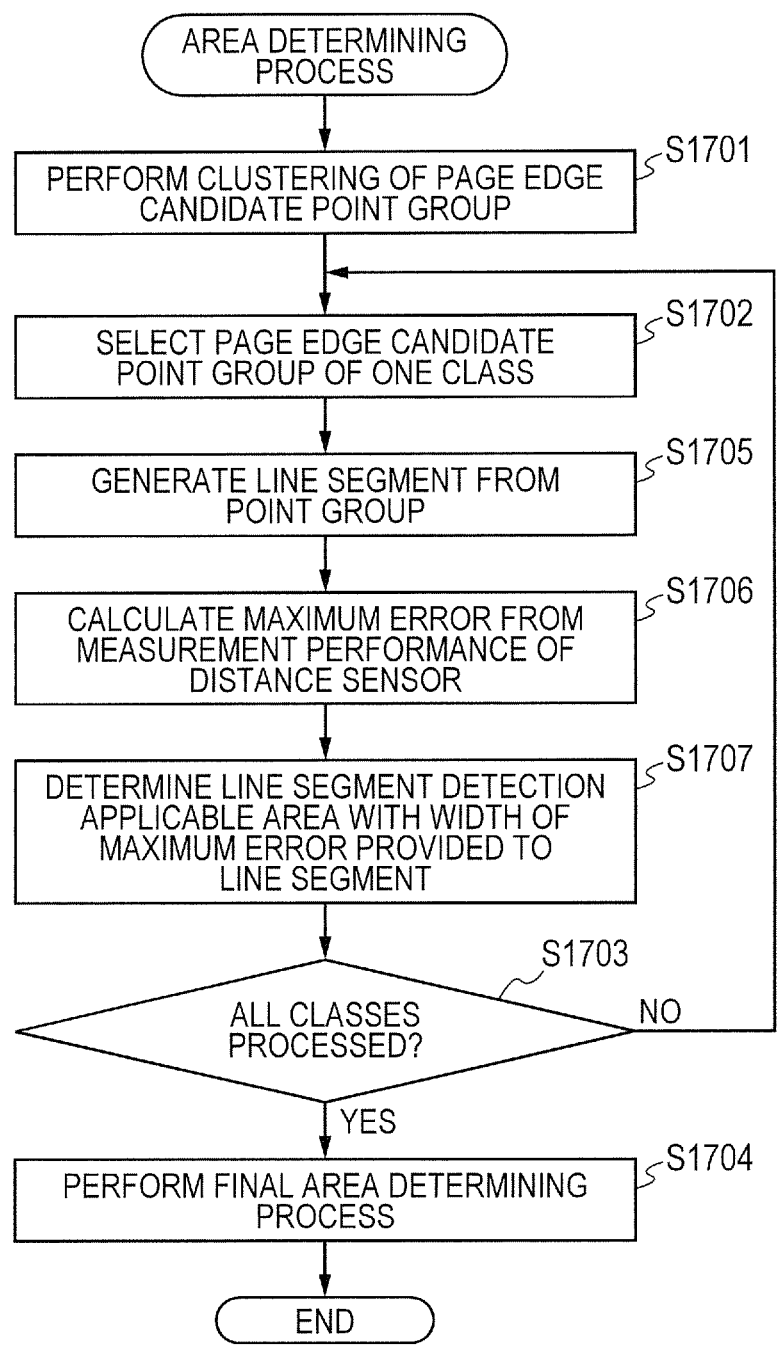
FIG. 17 is a flow chart indicating an area determining process.

For example, as in FIG. 16B, when page edge candidate point groups are appeared with a stepped state, the plural rectangular areas such as rectangular areas 1501 and 1502 are formed. However, according to the processes of the present embodiment, the book shape obtaining section 311 decides the rectangular area 1501, which is closer to the central part of the book, as the line segment detection applicable area and can specify the page edge even when the page edge candidate point groups are appeared with a stepped state.

Third Embodiment

Figure 18:
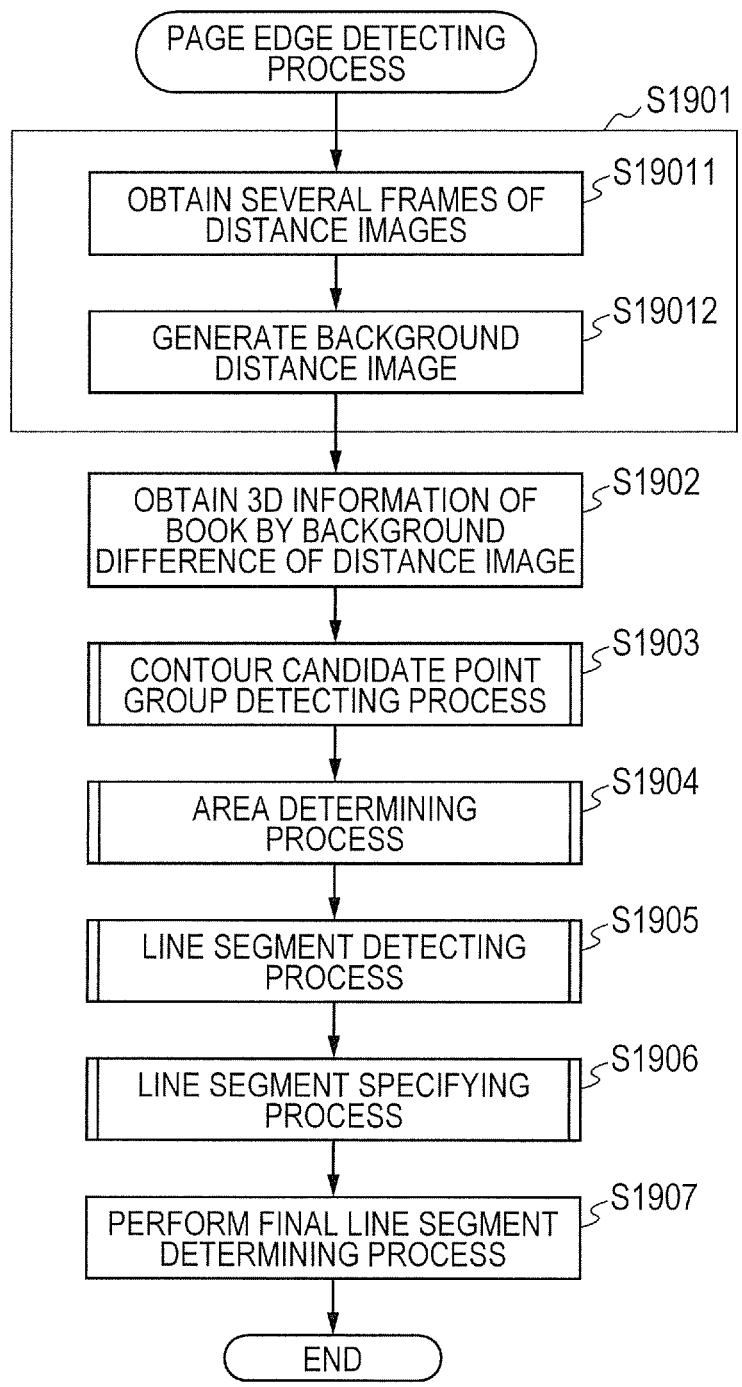
FIG. 18 is a flow chart indicating the whole of a page edge detecting process.

Another process in a situation similar to that of the second embodiment will be described in the third embodiment. FIG. 18 is a flow chart indicating the whole of the page edge detecting process. The flow chart in FIG. 18 is such a flow chart indicating the whole of the page edge detecting process of the third embodiment.

In S1901, the distance image obtaining section 308 obtains a background distance image. The process of S1901 is the same as that of S701.

In S1902, the book shape obtaining section 311 obtains distance information of the whole book by a background difference method. The process of S1902 is the same as that of S702.

In S1903, the book shape obtaining section 311 obtains the page edge candidate point group from the distance information of the whole book. The process of S1903 is the same as that of S703.

In S1904, the book shape obtaining section 311 determines a line segment detection applicable area. The process of S1904 is an area determining process in the present embodiment.

Figure 19:
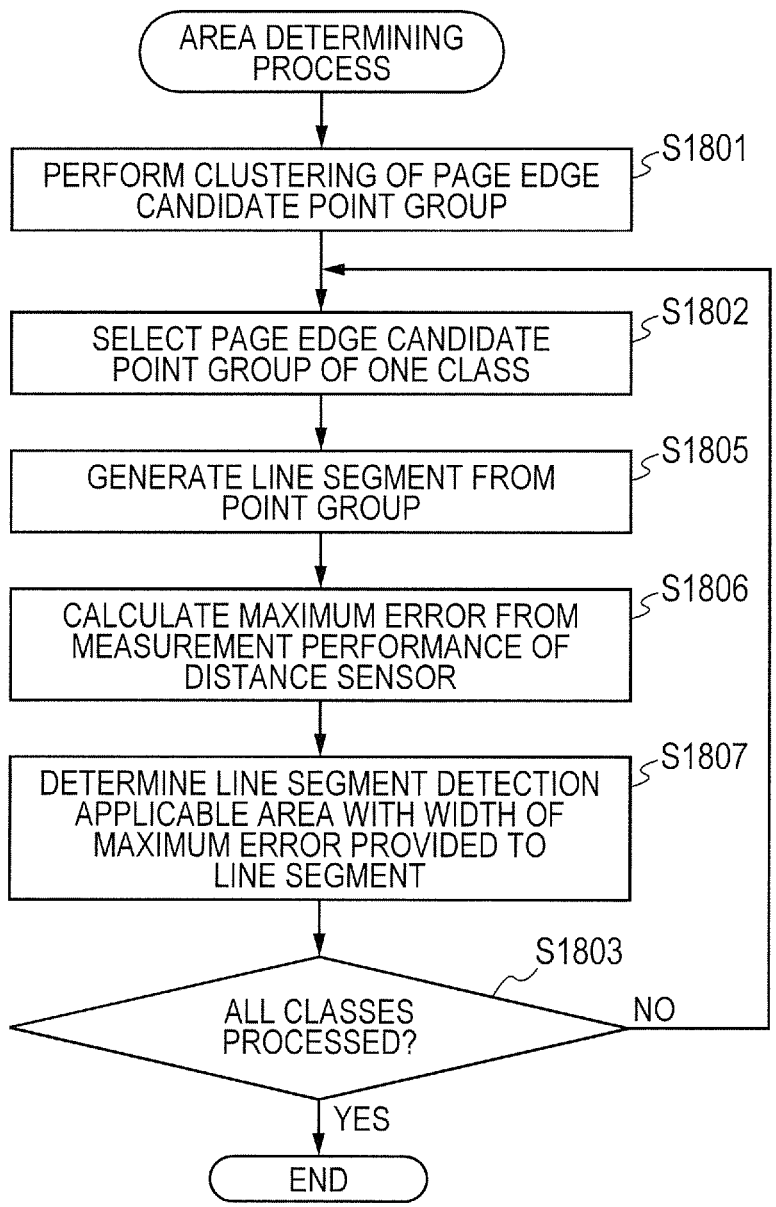
FIG. 19 is a flow chart indicating an area determining process.

A flow chart of the process of S1904 will be indicated in FIG. 19. The process of S1801 is the same as that of S1701. The process of S1802 is the same as that of S1702. The process of S1805 is the same as that of S1705. The process of S1806 is the same as that of S1706. The process of S1807 is the same as that of S1707. The process of S1803 is the same as that of S1703.

The clustering is performed to the page edge candidate point group by the area determining process according to the flow chart in FIG. 19, and the plural rectangular areas are determined.

In S1905 to S1906, the book shape obtaining section 311 specifies one line segment as the page edge from each rectangular area for the each rectangular area determined in S1904 and records the page edge in the RAM 203.

In S1905, the book shape obtaining section 311 detects the plural line segments from luminance image information in the each rectangular area determined in S1904. The process of S1905 is the same as that of S708.

In S1906, the book shape obtaining section 311 specifies one line segment from among the plural line segments which were detected in S1905 for the each rectangular area determined in S1904, as the page edge. The process of S1906 is the same as that of S709.

In S1907, the book shape obtaining section 311 selects a line segment, which is closest to the central part of the book, from among the respective line segments, which were specified as the page edges in S1905 to S1906 and recorded in the RAM 203, and terminates the process.

Figure 16C:
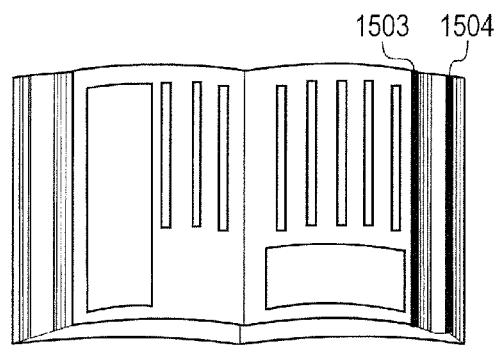

According to the processes described in the present embodiment, the book shape obtaining section 311 can perform the following process. That is, the book shape obtaining section 311 can select the line segment, which is closest to the central part of the book, such as a line segment 1503 as the page edge even when plural line segments such as lines 1503 and 1504 were obtained as the page edge in the situation as in FIG. 16C.

Fourth Embodiment

Figure 20A:
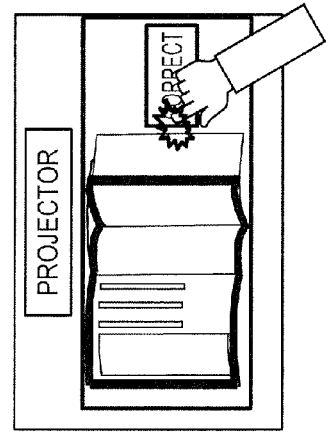
FIGS. 20A, 20B, 20C, 20D, 20E and 20F are diagrams for describing the whole processes.
Figure 20B:
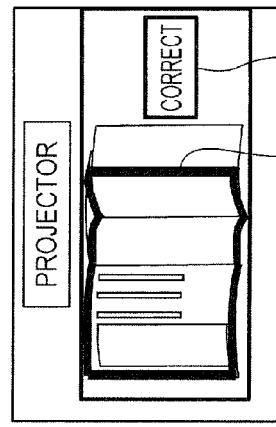
Figure 20C:
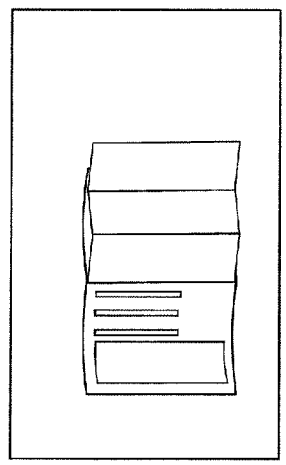

In the second and third embodiments, when the plural areas appeared, a process of obtaining the page edge by regarding that the spread page edge of the book is closest to the central part of the book in the step has been described. However, an area, to which the line segment detection has to be performed, does not always appear inside the book. Illustrations in the present embodiment will be indicated in FIGS. 20A to 20F. FIGS. 20A to 20F are diagrams for describing the whole processes of the present embodiment. As for a situation supposed by the present embodiment, for example, a Z-folding as indicated in FIG. 20A can be enumerated as an example. As in FIG. 20A, when the Z-folding exists in the book, although plural areas, which are determined from the page edge candidate point, appear, the book shape obtaining section 311 selects an area, which is closest to the central part of the book, in the second and third embodiments. However, the book shape obtaining section 311 must not select the area closest to the central part of the book for an example such as the Z-folding. In consideration of the above problem, in the present embodiment, a method of selecting a contour on the basis of an instruction of the user will be described.

Figure 21:
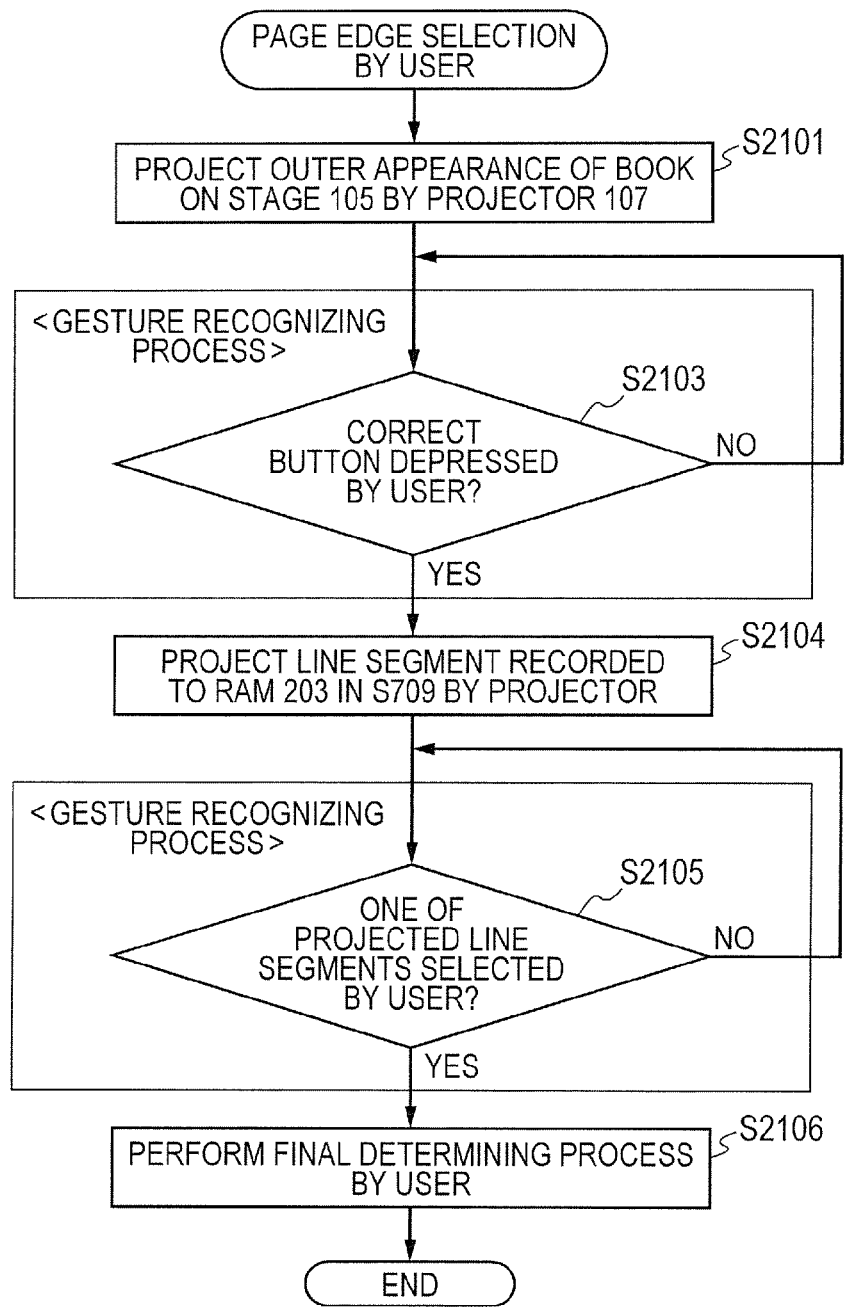
FIG. 21 is a flow chart indicating a page edge selecting process to be performed by a user.

A flow chart of the page edge selection, which is performed by the book shape obtaining section 311 in the present embodiment, based on a selection operation by the user will be indicated in FIG. 21. FIG. 21 is the flow chart indicating the page edge selecting process to be performed by the user.

In S2101, the book shape obtaining section 311 projects outer appearance of the book, which was obtained by the camera image obtaining section 307, on the stage 105 by using the projector 107 and displays the outer appearance of the book. In the present embodiment, the book shape obtaining section 311 creates an image, which is obtained by superimposing a contour, for example, such as a contour 2001 in FIG. 20B obtained from the page edge detected in the processes of the second and third embodiments, on the book, and projects the image on the stage 105 via the projector 107 and then displays the image. Further, the book shape obtaining section 311 may indicate a fact that plural contour candidates exist to the user by displaying a "correction" button such as a button 2002. Although the fact is indicated as a method of displaying the "correction" button in the present embodiment, it is not limited to the button, and it is enough that the fact of existence of the plural contour candidates is informed to the user.

In S2103, the book shape obtaining section 311 decides whether or not an operation of depressing the correction button performed by the user is recognized by the gesture recognizing section 309. As for a recognition technology of gesture, for example, a detection technology of a plane touch performed by a finger tip has been known. The book shape obtaining section 311 can detect a touch to a plane by the technology. However, as for the technology to be used, it is not especially limited to the technology if it is possible to detect the plane touch performed by a finger tip of the user. When it is decided that the operation of depressing the correction button performed by the user was recognized by the gesture recognizing section 309 as in FIG. 20C, the book shape obtaining section 311 advances the process to S2104. When it is decided that the operation of depressing the correction button performed by the user is not recognized by the gesture recognizing section 309, the book shape obtaining section 311 advances the process to S2103.

Figure 20D:
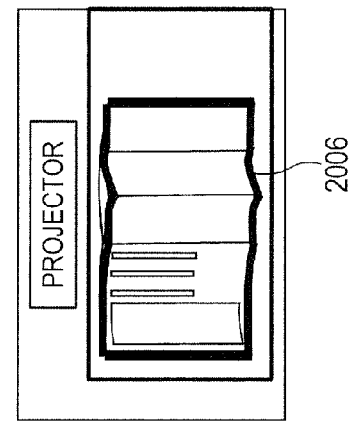

In S2104, the book shape obtaining section 311 creates an image, which was obtained by superimposing the line segment, which was recorded in the RAM 203 in S709, on the book, and projects the image to the stage 105 via the projector 107 as in FIG. 20D and then displays the image. It is assumed that line segments 2004 and 2005 in FIG. 20D respectively indicate such line segments specified as page edges from each of the rectangular areas recorded in the RAM 203 in S709. In addition, the book shape obtaining section 311 displays a message 2003 indicating intention of making the user select the line segment specified as the page edge from the each rectangular area.

Figure 20E:
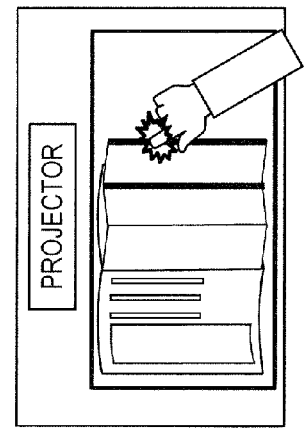

In S2105, the book shape obtaining section 311 decides whether or not an operation of selecting the line segment performed by the user is recognized by the gesture recognizing section 309. FIG. 20E indicates an example that the line segment 2005 was selected by the user. When the line segment was selected by the user, the book shape obtaining section 311 advances the process to S2106, and when the line segment was not selected by the user, the book shape obtaining section 311 advances the process to S2105.

Figure 20F:
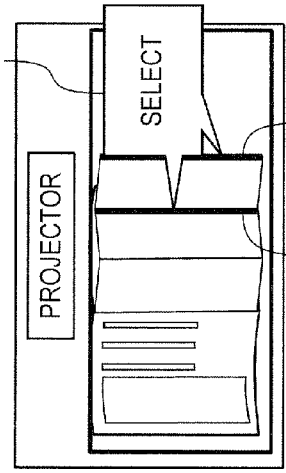

In S2106, the book shape obtaining section 311 finally determines the line segment which was selected by the user in S2105 as the page edge as indicated by a line segment 2006 in FIG. 20F.

According to the processes of the present embodiment, the book shape obtaining section 311 can determine a line segment to be regarded as the page edge by detecting an operation of selecting the line segment performed by the user even when the plural areas, which are determined from the plural page edge candidate points such as a case of the Z-folding or the like, appear.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-149065, filed Jul. 22, 2014, which is hereby incorporated by reference herein in its entirety.

What is claimed is:

1. An image processing apparatus comprising:
a captured image obtaining unit configured to obtain a captured image of a subject on a stage, the captured image being captured by an image capturing device;
a distance image obtaining unit configured to obtain a distance image of the subject, the distance image being generated by a distance image generating device;
a candidate point detecting unit configured to set a plurality of division lines at predetermined intervals on an area including the subject in the distance image obtained by the distance image obtaining unit, and, on the basis of distance information on the division line, to detect, for each of the division lines, a point at which a change amount of a distance is larger than a threshold on the division line, as a candidate point of a contour of the subject;
a line detecting unit configured to detect a line in the captured image on the basis of luminance information of the captured image obtained by the captured image obtaining unit; and
a determining unit configured to determine, in the captured image, one line in the plurality of lines as the contour of the subject, on the basis of a positional relation between the plurality of lines detected by the line detecting unit and the plurality of candidate points detected by the candidate point detecting unit.

2. The image processing apparatus according to claim 1, further comprising an area determining unit configured to determine, as an area for which the line is detected, an area including a plurality of points respectively corresponding to the plurality of candidate points detected by the candidate point detecting unit, in the captured image obtained by the captured image obtaining unit, wherein
the line detecting unit detects the line in the area determined by the area determining unit.

3. The image processing apparatus according to claim 2, wherein
the candidate point detecting unit sets a start point, a first end point distant from the start point by a set distance, and a second end point distant from the first end point by a set distance, on the division line, and the candidate point detecting unit detects the first end point as the candidate point in a case where a difference between an inclination obtained from the first end point and the start point and an inclination obtained from the second end point and the first end point is equal to or larger than a threshold.

4. The image processing apparatus according to claim 1, wherein the determining unit obtains a sum of distances between the candidate point and the line for each of the detected lines, and determines the line for which the sum is minimum as the line being the contour of the subject.

5. The image processing apparatus according to claim 1, further comprising:
   a displaying unit configured to display a screen including the plurality of lines detected by the line detecting unit; and
   a selecting unit configured to select one of the plurality of lines as the line being a contour of the subject, based on a selection operation via the screen displayed by the displaying unit.

6. The image processing apparatus according to claim 1, wherein the determining unit determines, in the captured image, the one line which is in the plurality of lines and is closest to the plurality of candidate points detected by the candidate point detecting unit.

7. The image processing apparatus according to claim 1, wherein the line detecting unit performs edge detection to the captured image, and detects the plurality of lines based on a result of the edge detection.

8. The image processing apparatus according to claim 1, wherein the subject includes a book.

9. An image processing method to be performed by an image processing apparatus comprising an image capturing device and a distance image generating device, the method comprising:
   obtaining a captured image of a subject on a stage, the captured image being captured by the image capturing device;
   obtaining a distance image of the subject, the distance image being generated by the distance image generating device;
   setting a plurality of division lines at predetermined intervals on an area including the subject in the obtained distance image, and, on the basis of distance information on the division line, detecting, for each of the division lines, a point at which a change amount of a distance is larger than a threshold on the division line, as a candidate point of a contour of the subject;
   detecting a line in the captured image on the basis of luminance information of the obtained captured image; and
   determining, in the captured image, one line in the plurality of lines as the contour of the subject on the basis of a positional relation between the detected plurality of lines and the detected plurality of candidate points.

10. The image processing method according to claim 9, wherein, in the captured image, the one line closest to the detected plurality of candidate points is determined in the plurality of lines.

11. The image processing method according to claim 9, wherein edge detection is performed to the captured image, and the plurality of lines are detected based on a result of the edge detection.

12. The image processing method according to claim 9, wherein the subject includes a book.

13. A non-transitory computer-readable recording medium storing a program that causes a computer to function as each unit of an image processing apparatus comprising:
   a captured image obtaining unit configured to obtain a captured image of a subject on a stage, the captured image being captured by an image capturing device;
   a distance image obtaining unit configured to obtain a distance image of the subject, the distance image being generated by a distance image generating device;
   a candidate point detecting unit configured to set a plurality of division lines at predetermined intervals on an area including the subject in the distance image obtained by the distance image obtaining unit, and, on the basis of distance information on the division line, to detect, for each of the division lines, a point at which a change amount of a distance is larger than a threshold on the division line, as a candidate point of a contour of the subject;
   a line detecting unit configured to detect a line in the captured image on the basis of luminance information of the captured image obtained by the captured image obtaining unit; and
   a determining unit configured to determine, in the captured image, one line in the plurality of lines as the contour of the subject, on the basis of a positional relation between the plurality of lines detected by the line detecting unit and the plurality of candidate points detected by the candidate point detecting unit.

* * * * *